US011030678B2

(12) United States Patent
Panigrahi et al.

(10) Patent No.: US 11,030,678 B2
(45) Date of Patent: Jun. 8, 2021

(54) USER-ADAPTIVE RESTAURANT MANAGEMENT SYSTEM

(71) Applicant: TOAST, INC., Boston, MA (US)

(72) Inventors: Toshit Panigrahi, Nashua, NH (US); Ronald Vick, Morton Grove, IL (US)

(73) Assignee: Toast, Inc., Boston, MA (US)

( * ) Notice: Subject to any disclaimer, the term of this patent is extended or adjusted under 35 U.S.C. 154(b) by 53 days.

(21) Appl. No.: 16/221,943

(22) Filed: Dec. 17, 2018

(65) Prior Publication Data

US 2020/0193505 A1 Jun. 18, 2020

(51) Int. Cl.
*G06Q 30/06* (2012.01)
*G06F 3/16* (2006.01)
(Continued)

(52) U.S. Cl.
CPC ......... *G06Q 30/0641* (2013.01); *G06F 3/017* (2013.01); *G06F 3/0482* (2013.01); *G06F 3/167* (2013.01); *G06Q 20/18* (2013.01)

(58) Field of Classification Search
CPC .... G06Q 30/0641; G06Q 20/18; G06F 3/017; G06F 3/0482; G06F 3/167
(Continued)

(56) References Cited

U.S. PATENT DOCUMENTS 6,415,555 B1 * 7/2002 Montague .............. G06Q 30/06 235/375
6,594,632 B1 7/2003 White
(Continued)

OTHER PUBLICATIONS

S. Pieska, M. Liuska, A. Auno, D. Oy, Intelligent Restaurant System Smartmenu, Dec. 2-5, 2013, 4th IEEE International Conference on Cognitive Infocommunications, pp. 625-630. (Year: 2013).*
(Continued)

*Primary Examiner* — Jason B Dunham
*Assistant Examiner* — Brittany E Bargeon
(74) *Attorney, Agent, or Firm* — Richard K. Huffman; Huffman Patent Group, LLC

(57) ABSTRACT

A user-adaptive order processing terminal includes a display, a microphone, a configuration manager, and a motion sensor. The display displays electronic menu items in a first area for selection by a user, where the electronic menu items are accessed via selection of one or more sub-menu items. The microphone detects audio spoken by the user. The configuration manager captures the audio from the microphone, transmits the audio via first messages to a backend server, receives second messages from the backend server providing text that corresponds to the audio, accesses suggested menu items that correspond to the text, and modifies a second area of the display to present the suggested menu items for selection, where the suggested menu items would otherwise be presented in the first area through selection of the one or more sub-menu items. The motion sensor subsequently detects distance to and motions performed by the user, where the configuration manager captures movements of the user from the motion sensor, transmit the motions via third messages to the backend server, receives fourth messages from the backend server providing 3-dimensional (3D) gestures that correspond to the movements, and adds one or more of the suggested menu items to an electronic order in accordance with the 3D gestures.

20 Claims, 11 Drawing Sheets

(51) Int. Cl.
*G06Q 20/18* (2012.01)
*G06F 3/0482* (2013.01)
*G06F 3/01* (2006.01)

(58) Field of Classification Search
USPC ........................................................ 705/27.1
See application file for complete search history.

(56) References Cited

U.S. PATENT DOCUMENTS

| | | | |
|---|---|---|---|
| 9,552,069 | B2 | 1/2017 | Gilad-bachrach et al. |
| 9,576,287 | B1 | 2/2017 | Kalinichenko et al. |
| 9,582,246 | B2 | 2/2017 | Klein et al. |
| 9,665,858 | B1 | 5/2017 | Kumar |
| 9,721,275 | B1 * | 8/2017 | Grier .................. G06Q 30/0269 |
| 9,721,314 | B2 | 8/2017 | Rose |
| 9,741,050 | B2 | 8/2017 | Stepanovich |
| 9,817,565 | B2 * | 11/2017 | Idzik .................... G06F 3/0487 |
| 9,875,469 | B1 | 1/2018 | Chin et al. |
| 10,467,559 | B1 * | 11/2019 | Svenson ............. G06Q 20/209 |
| 10,885,480 | B2 * | 1/2021 | Vick ................ G08B 13/19613 |
| 2003/0046166 | A1 * | 3/2003 | Liebman ................ G06Q 50/12 705/15 |
| 2004/0068441 | A1 * | 4/2004 | Werbitt ................. H04W 4/029 705/16 |
| 2004/0158494 | A1 * | 8/2004 | Suthar ................... G06Q 30/06 705/15 |
| 2007/0143127 | A1 * | 6/2007 | Dodd ................... G06Q 50/12 705/5 |
| 2009/0249443 | A1 | 10/2009 | Fitzgerald et al. |
| 2009/0259553 | A1 * | 10/2009 | Carroll .................. G06Q 20/20 705/15 |
| 2011/0148931 | A1 * | 6/2011 | Kim ........................ G06F 3/011 345/660 |
| 2011/0282697 | A1 | 11/2011 | Fitzgerald et al. |
| 2013/0066749 | A1 | 3/2013 | Cooke et al. |
| 2013/0097038 | A1 * | 4/2013 | Potter ................... G06Q 30/00 705/21 |
| 2013/0132274 | A1 | 5/2013 | Henderson et al. |
| 2014/0006205 | A1 * | 1/2014 | Berry .................. G06Q 20/322 705/26.7 |
| 2014/0052613 | A1 | 2/2014 | Tavakoli et al. |
| 2014/0214534 | A1 * | 7/2014 | L'Heureux ........... G06Q 50/12 705/14.53 |
| 2014/0244408 | A1 | 8/2014 | Grubel, Jr. et al. |
| 2015/0026166 | A1 * | 1/2015 | Han ..................... G06F 16/5866 707/723 |
| 2015/0066746 | A1 * | 3/2015 | Nichols .............. G06Q 20/3265 705/39 |
| 2015/0073925 | A1 * | 3/2015 | Renfroe ................ G06Q 50/12 705/15 |
| 2015/0149254 | A1 * | 5/2015 | Sakamoto .......... G06Q 10/0633 705/7.34 |
| 2015/0227978 | A1 * | 8/2015 | Woycik .............. G06Q 30/0268 705/14.65 |
| 2015/0278830 | A1 | 10/2015 | Zamer et al. |
| 2015/0302388 | A1 | 10/2015 | Seidman et al. |
| 2016/0011668 | A1 * | 1/2016 | Gilad-Bachrach ...... G06F 3/046 345/156 |
| 2016/0092972 | A1 * | 3/2016 | Blatstein ............ G06Q 30/0623 705/26.81 |
| 2016/0125449 | A1 * | 5/2016 | Beatty ................. G06Q 20/202 705/14.38 |
| 2017/0055752 | A1 * | 3/2017 | Mueller ............. G06Q 30/0641 |
| 2017/0161851 | A1 | 6/2017 | Li et al. |
| 2017/0193530 | A1 * | 7/2017 | Newsum ............... H04W 4/021 |
| 2017/0228034 | A1 | 8/2017 | Hollar |
| 2017/0269703 | A1 | 9/2017 | Khosravy et al. |
| 2018/0040027 | A1 * | 2/2018 | Han ...................... G06Q 30/02 |
| 2018/0253805 | A1 * | 9/2018 | Kelly .................. G06Q 20/322 |
| 2018/0284902 | A1 | 10/2018 | Yamaguchi et al. |
| 2018/0332216 | A1 | 11/2018 | Long et al. |
| 2020/0118194 | A1 | 4/2020 | Greenberger et al. |

OTHER PUBLICATIONS

Cheong, Soon Nyean et al. "Design and Development of Multi-Touchable E-Restaurant Management System." 2010 International Conference on Science and Social Research (CSSR 2010). Dec. 5-7, 2010. Kuala Lumpur, Malaysia. pp. 1-6.

Shiba, Yoshiki et al. "Visual Interface and Interaction Design for self-service orders at a Restaurant." 2016 20th International Cnoference Information Visualization. Jul. 2016. pp. 230-235.

* cited by examiner

PAPER-BASED RESTAURANT MANAGEMENT

TOUCHSCREEN-BASED RESTAURANT MANAGEMENT

ADAPTIVE RESTAURANT MANAGEMENT TERMINAL – FRONT VIEW

ADAPTIVE RESTAURANT MANAGEMENT TERMINAL – TOP VIEW

| SWIPE DIRECTION | EXEMPLARY COMMAND |
|---|---|
| - X | CLEAR CURRENT ORDER |
| + Z | INITIATE CURSOR AND FOLLOW HAND WITH CURSOR |
| + Z + Z | SELECT AND OPEN ORDER |
| - Z | DESELECT ORDER |
| + X | SCROLL TO PREVIOUS ORDER |
| + Y | SCROLL UP IN SELECTED ORDER |
| - Y | SCROLL DOWN IN SELECTED ORDER |

*RESTAURANT MANAGEMENT TERMINAL WITH MENU ASSIST*

USER-ADAPTIVE RESTAURANT MANAGEMENT SYSTEM

CROSS-REFERENCE TO RELATED APPLICATIONS

This application is related to the following co-pending U.S. Patent Applications, each of which has a common assignee and common inventors.

| SERIAL NUMBER | FILING DATE | TITLE |
| --- | --- | --- |
| 16/221,787 | Dec. 17, 2018 | ADAPTIVE RESTAURANT MANAGEMENT SYSTEM |
| 16/221,844 | Dec. 17, 2018 | APPARATUS AND METHOD FOR ADAPTIVE RESTAURANT MANAGEMENT |
| 16/221,880 | Dec. 17, 2018 | COMMAND-ADAPTIVE RESTAURANT MANAGEMENT SYSTEM |
| 16/221,902 | Dec. 17, 2018 | CONTEXT-ADAPTIVE RESTAURANT MANAGEMENT SYSTEM |

BACKGROUND OF THE INVENTION

Field of the Invention

This invention relates in general to the field of retail establishment management, and more particularly to process management systems that are adaptive for intended use and which employ one or more features directed to acceleration of order entry and fulfillment processes.

Description of the Related Art

In prior times, when a patron entered a retail establishment (e.g., a store, a restaurant, etc.), an employee of the establishment assisted the patron in order to locate and generate an order of retail items for preparation and delivery. The employee either remembered the items or wrote the selections down on a paper order form. The order was then communicated/provided to an order processing station where one or more other employees assembled the prepared and the items on the order. The completed items were then delivered to the patron. Such a system has been employed for hundreds of years and is still used in many small establishments.

In more recent years, establishments—especially larger ones—are switching over from paper-based ordering to electronic screen-based ordering systems. These systems may employ conventional displays for viewing menu items and conventional keyboards for entry of selected menu items to configure an order for a patron. Other forms of electronic ordering systems comprise touchscreen-based terminals (e.g., special purpose tablet computers—both wired and wireless—to generate orders and to communicate those orders to one or more order processing stations. These order processing stations may additionally have (typically) larger touchscreen-based terminals, whereon taken orders are displayed for preparation, and whereby order processors indicate completion of the orders. Completion is generally indicated by touching a specified area of the touchscreen terminals or by actuating controls that are coupled to the terminals.

As one skilled in the art will appreciate, many order processing environments are riddled with substances that are detrimental to electronic devices. Consider a restaurant kitchen, where one skilled will also appreciate that most food ingredients may damage electronic devices when they come in contact with the devices. In addition, many order processing environments require that order processors wear protective gear, which may also impede interaction with a touchscreen or other electronic device to indicate completion of orders.

The present inventors have observed the above problems and limitations in the art and have sensed a need for apparatus and methods within order entry and processing environments that preclude degradation of electronic order entry and processing devices, and that furthermore may be employed to accelerate order entry ad processing tasks over that which has heretofore been provided.

Therefore, what is needed is a retail management system that employs 3D gestures, to accelerate placement of orders and to indicate order completion.

What is also needed is a retail management system that employs voice commands, to accelerate placement of orders and to indicate order completion.

What is additionally needed is a retail management system that employs voice commands to enter a 3D gesture mode, where the 3D gestures are used to accelerate placement of orders and to indicate order completion.

What is furthermore needed is a retail management system that employs facial recognition for configuration of associated order entry and processing devices, including entering into a 3D gesture mode, where the 3D gestures are used to accelerate placement of orders and to indicate order completion.

What is moreover needed is a retail management system that suggests order selections based upon voice recognition of key terms, and that utilized 3D gestures to select from among the suggested order selections.

SUMMARY OF THE INVENTION

The present invention, among other applications, is directed to solving the above-noted problems and addresses other problems, disadvantages, and limitations of the prior art. In one embodiment, a user-adaptive order processing terminal is provided that includes a display, a microphone, a configuration manager, and a motion sensor. The display is configured to display electronic menu items in a first area for selection by a user, where the electronic menu items are accessed via selection of one or more sub-menu items. The microphone is configured to detect audio spoken by the user. The configuration manager is coupled to the display and the microphone, and is configured to capture the audio from the microphone, to transmit the audio via first messages to a backend server, to receive second messages from the backend server providing text that corresponds to the audio, to access suggested menu items that correspond to the text, and to modify a second area of the display to present the suggested menu items for selection, where the suggested menu items would otherwise be presented in the first area through selection of the one or more sub-menu items. The motion sensor is coupled to the configuration manager, and is configured to subsequently detect distance to and motions performed by the user, where the configuration manager captures movements of the user from the motion sensor, transmit the motions via third messages to the backend server, receives fourth messages from the backend server providing 3-dimensional (3D) gestures that correspond to the movements, and adds one or more of the suggested menu items to an electronic order in accordance with the 3D gestures.

One aspect of the present invention contemplates a user-adaptive order processing terminal that has a display, a microphone, an order processor, and a motion sensor. The display is configured to display electronic menu items in a first area for selection by a user, where the electronic menu items are accessed via selection of one or more sub-menu items. The microphone is configured to detect audio spoken by the user. The order processor is coupled to the display and the motion sensor, and is configured to maintain current states of all orders being fulfilled. The order processor includes current state fields and a configuration manager. The current state fields each maintain a current state for a corresponding one or the orders being fulfilled. The configuration manager is coupled to the display and the microphone, and is configured to capture the audio from the microphone, to transmit the audio via first messages to a backend server, to receive second messages from the backend server providing text that corresponds to the audio, to access suggested menu items that correspond to the text, and to modify a second area of the display to present the suggested menu items for selection, where the suggested menu items would otherwise be presented in the first area through selection of the one or more sub-menu items. The motion sensor is coupled to the order processor, and is configured to subsequently detect distance to and motions performed by the user, where the configuration manager captures movements of the user from the motion sensor, transmit the motions via third messages to the backend server, receives fourth messages from the backend server providing 3-dimensional (3D) gestures that correspond to the movements, and adds one or more of the suggested menu items to an electronic order in accordance with the 3D gestures.

Another aspect of the present invention comprehends a user-adaptive order processing method, including: displaying electronic menu items in a first area for selection by a user, where the electronic menu items are accessed via selection of one or more sub-menu items; employing a microphone to detect audio spoken by the user; capturing the audio from the microphone, transmitting the audio via first messages to a backend server, receiving second messages from the backend server providing text that corresponds to the audio, accessing suggested menu items that correspond to the text, and modifying a second area of the display to present the suggested menu items for selection, where the suggested menu items would otherwise be presented in the first area through selection of the one or more sub-menu items; and subsequently detecting distance to and motions performed by the user by capturing movements of the user from a motion sensor, transmitting the motions via third messages to the backend server, receiving fourth messages from the backend server providing 3-dimensional (3D) gestures that correspond to the movements, and adding one or more of the suggested menu items to an electronic order in accordance with the 3D gestures.

BRIEF DESCRIPTION OF THE DRAWINGS

These and other objects, features, and advantages of the present invention will become better understood with regard to the following description, and accompanying drawings where.

DETAILED DESCRIPTION

Figure 1:
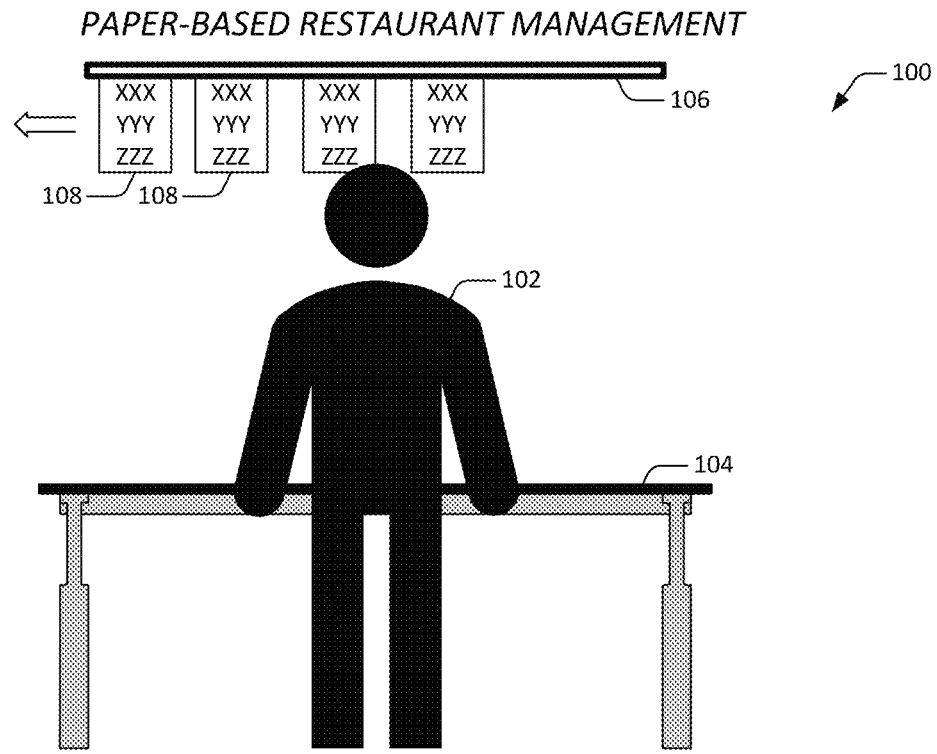
FIG. 1 is a diagram illustrating a present-day technique for restaurant management that is paper based.

Exemplary and illustrative embodiments of the invention are described below. It should be understood at the outset that, although exemplary embodiments are illustrated in the figures and described below, the principles of the present disclosure may be implemented using any number of techniques, whether currently known or not. In the interest of clarity, not all features of an actual implementation are described in this specification, for those skilled in the art will appreciate that in the development of any such actual embodiment, numerous implementation specific decisions are made to achieve specific goals, such as compliance with system-related and business-related constraints, which vary from one implementation to another. Furthermore, it will be appreciated that such a development effort might be complex and time-consuming, but would nevertheless be a routine undertaking for those of ordinary skill in the art having the benefit of this disclosure. Various modifications to the preferred embodiment will be apparent to those skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

The present invention will now be described with reference to the attached figures. Various structures, systems, and devices are schematically depicted in the drawings for purposes of explanation only and so as to not obscure the present invention with details that are well known to those skilled in the art. Nevertheless, the attached drawings are included to describe and explain illustrative examples of the present invention. Unless otherwise specifically noted, articles depicted in the drawings are not necessarily drawn to scale.

The words and phrases used herein should be understood and interpreted to have a meaning consistent with the understanding of those words and phrases by those skilled in the relevant art. No special definition of a term or phrase (i.e., a definition that is different from the ordinary and customary meaning as understood by those skilled in the art) is intended to be implied by consistent usage of the term or phrase herein. To the extent that a term or phrase is intended to have a special meaning (i.e., a meaning other than that understood by skilled artisans) such a special definition will be expressly set forth in the specification in a definitional manner that directly and unequivocally provides the special definition for the term or phrase. As used in this disclosure, "each" refers to each member of a set, each member of a subset, each member of a group, each member of a portion, each member of a part, etc.

Applicants note that unless the words "means for" or "step for" are explicitly used in a particular claim, it is not intended that any of the appended claims or claim elements are recited in such a manner as to invoke 35 U.S.C. § 112(f).

Definitions

Central Processing Unit (CPU): The electronic circuits (i.e., "hardware") that execute the instructions of a computer program (also known as a "computer application" or "application") by performing operations on data that include arithmetic operations, logical operations, and input/output operations.

Microprocessor: An electronic device that functions as a CPU on a single integrated circuit. A microprocessor receives digital data as input, processes the data according to instructions fetched from a memory (either on-die or off-die), and generates results of operations prescribed by the instructions as output. A general-purpose microprocessor may be employed in a desktop, mobile, or tablet computer, and is employed for uses such as computation, text editing, multimedia display, and Internet browsing. A microprocessor may also be disposed in an embedded system to control a wide variety of devices including appliances, mobile telephones, smart phones, and industrial control devices.

Instruction Set Architecture (ISA) or Instruction Set: A part of a computer architecture related to programming that includes data types, instructions, registers, addressing modes, memory architecture, interrupt and exception handling, and input/output. An ISA includes a specification of the set of opcodes (i.e., machine language instructions), and the native commands implemented by a particular CPU.

x86-Compatible Microprocessor: A microprocessor capable of executing computer applications that are programmed according to the x86 ISA.

Microcode: A term employed to refer to a plurality of micro instructions. A micro instruction (also referred to as a "native instruction") is an instruction at the level that a microprocessor sub-unit executes. Exemplary sub-units include integer units, floating point units, MMX units, and load/store units. For example, micro instructions are directly executed by a reduced instruction set computer (RISC) microprocessor. For a complex instruction set computer (CISC) microprocessor such as an x86-compatible microprocessor, x86 instructions are translated into associated micro instructions, and the associated micro instructions are directly executed by a sub-unit or sub-units within the CISC microprocessor.

Figure 2:
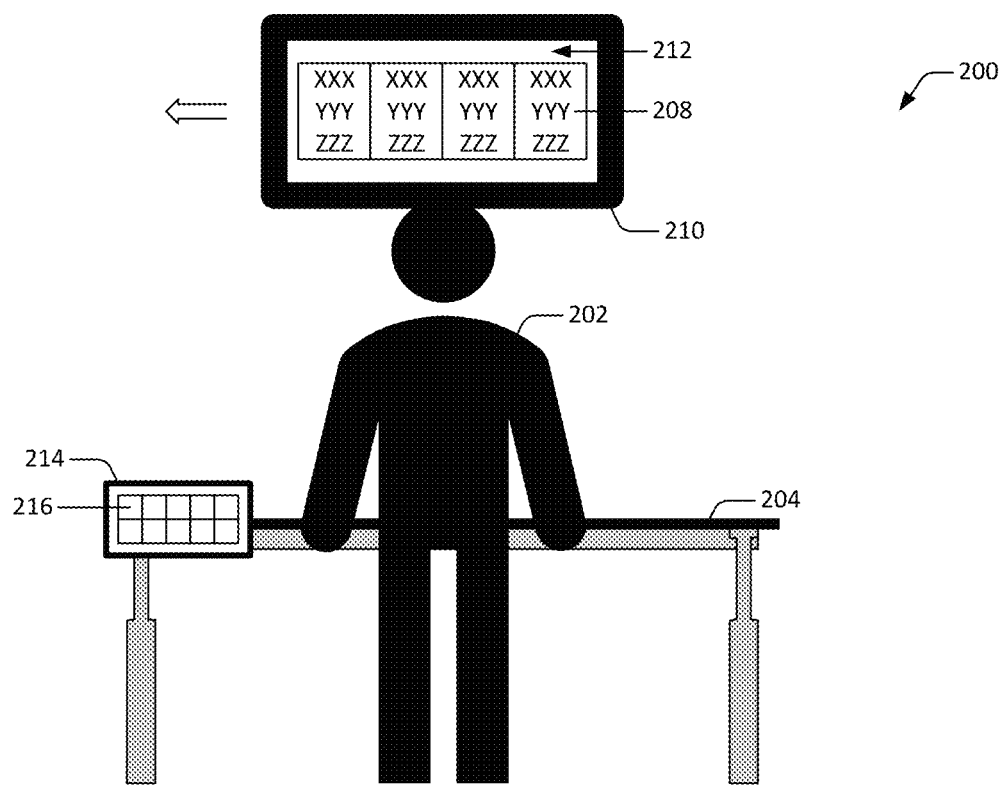
FIG. 2 is a diagram depicting another present-day technique for restaurant management that is touchscreen based.

In view of the above background discussion on retail establishment management systems and associated techniques employed within present-day establishments for receiving and processing orders, a discussion these systems will be presented with reference to FIGS. 1-2. Following this, a discussion of the present invention will be presented with reference to FIGS. 3-12. The present invention overcomes the disadvantages and limitations of present-day order processing techniques by providing an adaptive restaurant management system featuring hands-free kitchen displays, kiosks, and fixed and mobile point-of-sale (POS) terminals that are adaptable to configuration and environment, and that provide for increased order processing throughput and efficiency, along with providing for processing improvements in the displays, kiosks, and terminals themselves.

Referring to FIG. 1, a diagram 100 is presented illustrating a present-day technique for restaurant management that is paper based. This technique, as one skilled in the art will appreciate, is widely employed within many retail establishments all over the world and is most prevalently employed within restaurants. The diagram 100 shows an order processor 102 who is responsible for processing orders placed for prepared goods within the establishment. In a big box store or warehouse, the goods may comprise one or more merchandised items, and the order processor 102 may be required to aggregate and assemble the items. In a restaurant, the order processor 102 may be required to assemble and prepare food items selected from the restaurant's menu.

Typically, the order processor 102 may be positioned at a workstation 104 and may be within sight and touch distance of one or more paper orders 108 upon which are written one or more menu items XXX, YYY, ZZZ that patrons have selected from the menu. The paper orders 108 are generated by staff (e.g., waiters) and brought to the workstation 104. The paper orders 108 are then temporarily affixed (e.g., clipped, pinned, etc.) to an order holding device 106 (e.g., a rail, a line, a magnetic strip, etc.) As the order processor 102 completes an assigned order, he/she may remove its corresponding paper order 108, hand the paper order to order delivery staff (e.g., a waiter, expeditor, etc.), and begin preparation of menu items XXX, YYY, ZZZ shown on a next paper order 108. The diagram 100 shows the order processor 102 preparing orders from left to right as shown on the holding device 106 and removing the leftmost paper order 108 as it is completed; however, as one skilled in the art will appreciate, some establishments work right to left because such a convention is a function of the order processing environment. It is noted that to clear an order, its corresponding paper order 108 must be touched and handled by the order processor 102 or by other staff.

Now referring to FIG. 2, a diagram 200 is presented depicting another present-day technique for restaurant management that is touchscreen based. This technique, though not as widely employed as the paper-based technique of FIG. 1, is increasingly being employed in establishments having significantly greater numbers of patrons that those establishments that utilize paper orders 108. The diagram 200 shows an order processor 202 who is responsible for processing orders placed for prepared goods within the establishment. Like the scenario of FIG. 1, the order processor 202 may be required to assemble and prepare merchandise or food items selected from a menu.

Typically, the order processor 202 may be positioned at a workstation 204 and may be within sight and touch distance of a kitchen display screen (KDS) 210 upon which are displayed one or more electronic orders 208, each comprising menu items XXX, YYY, ZZZ that patrons have selected from the menu. The electronic orders 208 are generated by staff (e.g., waiters) and transmitted to the KDS 210 for display to the order processor 202. In some environments, staff (e.g., waiters) may take orders by hand or by memory and may enter those orders into a fixed order entry terminal that is coupled to the KDS 210. In other environments, staff may enter orders directly into a mobile terminal that transmits the orders via a wireless link (e.g., Wi-Fi) to the KDS 210. As one skilled in the art will appreciate, a larger establishment may have numerous workstations 204 and KDSs 210 for performing specified preparation functions (e.g., salad station, pasta station, grill master, expeditor, etc.) and portions of a given electronic order 208 may be prepared by order processors 202 at one or more of the numerous workstations 204.

Like the paper orders 108 of FIG. 1, the electronic orders 208 are presented on a display area 212 of the KDS 210. In some cases, the display area 212 comprises a touchscreen, and as the order processor 202 completes an assigned order, he/she may remove its corresponding electronic order 208 by performing touch gestures on the display area 212 (e.g., swipe left, double-touch click, and swipe up, etc.) and begin preparation of menu items XXX, YYY, ZZZ shown on a next electronic order 208. As the electronic order 208 is removed, its completion may be communicated to staff so that the corresponding order may be delivered to an expeditor or directly to a patron. The diagram 200 shows the order processor 202 preparing orders from left to right as shown on the display 212, deleting the leftmost electronic order 208 as it is completed, and shifting remaining electronic orders 208 to the left; however, as noted above with reference to FIG. 1, some establishments work right to left, and such convention is a function of the order processing environment. Like the environment of FIG. 1, to clear an order, the order processor 202 or staff is required to physically touch the display area 212 of the KDS 210 and, as one skilled in the art will further appreciate, many order processing workstations 204 present environments that are detrimental to the handling of electronic devices such as the KDS 210. Environmental factors that may cause error, degradation, or failure of a touchscreen KDS 210 include, but are not limited to, moisture, dirt, grease, food items, solvents, etc. In addition, sanitation or safety requirements may require that the order processor 202 wear hand protection, which interferes with performing touch gestures.

Accordingly, the diagram 200 shows an optional control device 214 comprising one or more actuators 216. The control device 214 may be coupled to the KDS 210 via a wired or wireless link (not shown) and may be employed by the order processor 202 in lieu of performing touch gestures on the display area 212 of the KDS 210. Generally, the control device 216 costs substantially less than the KDS 210. In a restaurant environment, the control device 214 is referred to as a bump bar 214 and comprises actuators 216 that, when actuated, direct the KDS 210 to perform the same functions as if the order processor 202 touched the display area 212. The actuators 216 may comprise mechanical switches or small touchscreen switches. The control device 216 may provide for some level of environmental resistance (e.g., switch seals, screen cover) and may further allow for actuations by the order processor 202 when wearing protection (e.g., gloves). It is noted, however, that a bump bar configuration, while precluding contamination of the KDS 210, merely shifts potential contamination effects to the bump bar 216.

The present inventors have observed that potential contamination effects are a significant problem in the industry and have also noted that these effects are increasingly pronounced as more and more establishments are converting their order processing environments from paper-based environments to electronic device-based environments. In addition, the present inventors have observed workstation environments where it is difficult for an order processor 202 to physically access a touchscreen KDS 210, such as environments where the KDS 210 is beyond reasonable arm's length away. Therefore, the present inventors have sensed a need in the art for more reliable, durable, and user-friendly techniques and mechanisms for processing orders in environments that present the potential for contamination of touchscreen-based order processing devices, such as the KDS 210 of FIG. 2.

The present invention overcomes the above noted limitations and disadvantages, and other related problems, by providing apparatus and methods that entirely preclude contamination of touchscreen-based order processing devices, and that furthermore significantly increase order processing efficiencies within order processing environments. In addition to these noted advantages, the techniques disclosed herein according to the present invention may also be applied to related order processing devices that are employed outside of a kitchen or other hazardous environment. Such order processing devices include, but are not limited to, handheld mobile order processing terminals, point-of-sale terminals, host terminals, and self-ordering kiosk terminals. The present invention will now be discussed with reference to FIGS. 3-12.

Figure 3:
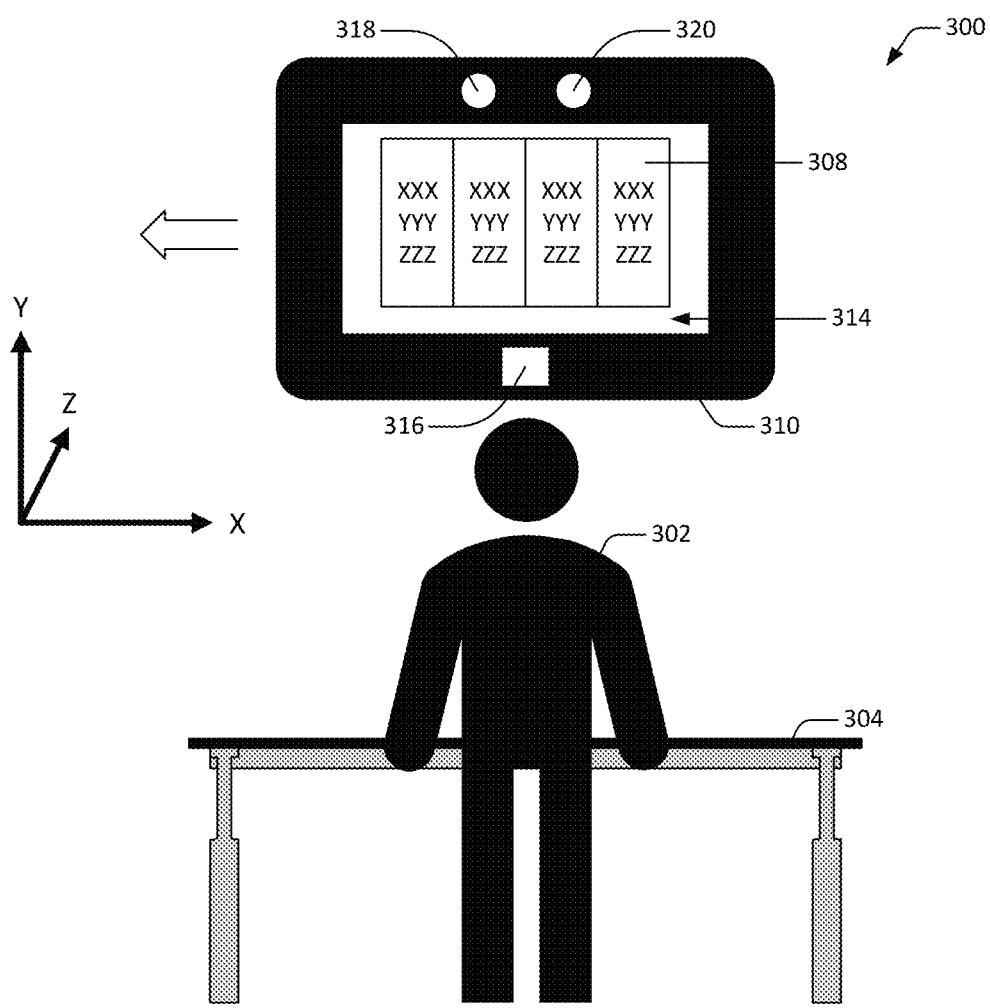
FIG. 3 is a diagram featuring a front view of an adaptive restaurant management terminal according to the present invention.

Now referring to FIG. 3, a diagram 300 is presented featuring a front view of an adaptive restaurant management terminal 310 according to the present invention. Like the diagrams 100, 200 of FIGS. 1-2, diagram 300 depicts an order processor 302 who is responsible for processing orders placed for prepared goods within an establishment. In a big box store or warehouse, the goods may comprise one or more merchandised items, and the order processor 302 may be required to aggregate and assemble the items. In a restaurant, the order processor 302 may be required to assemble and prepare food items selected from the restaurant's menu.

Preferably, the present invention is intended for use in a restaurant setting; however, the present inventors note that the apparatus and methods disclosed herein may be employed in any order processing environment, regardless of whether contaminants are present or not, because it is an objective of the present invention to not only preclude physical degradation of order processing devices, but also to improve order processing throughput in an establishment. In order to clearly teach aspects of the present invention, a restaurant environment will be employed along with related terms such as waiter, host, chef, etc., though the reader should bear in mind that the scope of the present invention extends beyond application in restaurants.

Accordingly, the diagram 300 depicts the adaptive terminal 310 adjacent to the order processor 302, within viewing range, but not necessarily within arm's reach. In one embodiment, the adaptive terminal 310 may be configured as a kitchen display screen (KDS) 310, that is employed within a restaurant kitchen to present electronic orders 308 on a display 314 to the order processor 302 for preparation of menu items XXX, YYY, ZZZ. In one embodiment, the KDS 310 comprises a touchscreen display 314. In another embodiment, the KDS 310 comprises a display without touchscreen features. The order processor 302 may or may not be utilizing ingredients that could potentially contaminate the KDS 310.

In contrast to the KDS 210 of FIG. 2, the KDS 310 according to the present invention may further comprise a video camera 318, a motion sensor 320, and a microphone 316. In one embodiment, when enabled, the motion sensor 320 may be employed to detect and interpret non-touch 3-dimensional (3D) gestures that are performed by the order processor 302 to direct the KDS 310 to execute specified functions such as, but not limited to, clearing an electronic order 308, scrolling to a next or previous order 308, selecting and opening details of an order 308, and other order processing functions that may be required in a restaurant kitchen. An exemplary 3D axis is shown in the diagram 300 whereby the motion sensor 320 may interpret left to right movements as positive X, down to up movement as positive Y, and push movements as positive Z. It is noted that this coordinate system is exemplary and provided to teach aspects of the present invention and, as one skilled in the art will appreciate, other types of coordinate systems may be employed.

In another embodiment, when enabled, the microphone 316 may be employed to detect and interpret voice commands spoken by the order processor 302 or other staff (not shown) to direct the KDS 310 to execute the functions noted above. In a combined embodiment, when enabled, the motion sensor 320 and microphone 320 may be synergistically employed to detect and interpret both non-touch 3D gestures and voice commands performed and/or spoken by the order processor 302 or other staff to direct the KDS 310 to execute the functions noted above. In yet another embodiment, a command spoken to the microphone 316 may be employed to enable detection and interpretation of 3D gestures by the motion sensor 320. In a further embodiment, a 3D gesture performed by the order processor 302 may be employed to disable detection and interpretation of 3D gestures by the motion sensor 320 and to enable detection and interpretation of voice commands spoken into the microphone 316. In an adaptive embodiment, the video camera 318 may be employed to capture and image of the order processor 302 whereby, as will be described in further detail below, voice-based, 3D gesture-based, and video-based functions of the KDS 310 are automatically configured as a function of the captured image.

In yet another embodiment, the KDS 310 may comprise a touchpad display 310 on the order of 15 inches, an example of which is a 1I-Series 2.0 for Android 15" AiO Touchscreen as produced by Elo Touch Solutions, Inc. In yet a further embodiment, the KDS 310 may comprise a touchpad display 310 on the order of 22 inches, an example of which is a 1I-Series 2.0 for Android 22" AiO Touchscreen as produced by Elo Touch Solutions, Inc. In both embodiments, the microphone 316 and camera 318 are integrated into the touchpad displays 310, and the motion sensor 320 is coupled to the touchpad displays 310 via a connector (not shown), such as a USB connector. Other embodiments contemplate a camera 318, motion sensor 320 and microphone 316 that are separate from, but coupled to, the touchpad display 310, via a connector or other conventional port, such as a USB port.

In one embodiment, the microphone 316 may comprise a directional microphone 316 with an audio field of coverage, where captured audio may additionally be employed by other components (not shown) of a restaurant management system according to the present invention for purposes of noise cancellation. In another embodiment, the microphone 316 may comprise a low-power microphone 316 that listens for one or more specific words (e.g., "Hey KDS"), and upon detecting the one or more specific words, commands the KDS 310 to wake up from a low-power mode, or that commands the KDS 310 to enter a 3D gesture mode.

Preferably, the motion sensor 320 may comprise one or more passive infrared (PIR) sensors 320 that exhibit a sensitivity range up to approximately 20 feet with a horizontal field of view (FOV) of approximately 110 degrees and a vertical (FOV) of approximately 70 degrees. In all embodiments, the motion sensor 320 is configured to communicate motions of the order processor 302.

In operation, when enabled, the motion sensor 320 may detect and interpret a horizontal right to left motion of a hand of the order processor 302 as a command to the KDS 310 complete a leftmost order 308, to communicate completion of the leftmost order 308 to staff, and to stage a next order 308 for preparation. In another embodiment, when enabled, the motion sensor 320 may detect and interpret one or more specified words (e.g., "KDS, clear current order") spoken by the order processor 302 as a command to the KDS 310 complete a leftmost order 308, to communicate completion of the leftmost order 308 to staff, and to stage a next order 308 for preparation. It is not a purpose of the present disclosure to present an exhaustive list of 3D gestures and voice commands for use in a restaurant or other retail order processing environment, but rather to teach features and details that provide for tailoring of gestures, spoken audio, and captured video images within a restaurant management system according to the present invention, whereby employment of those tailored gestures, spoken audio, and captured video images result in increased order processing speeds along with increased performance of the order processing devices 310 themselves, without exposing the order processing devices 310 to any form of physical contact by staff 302.

Figure 4:
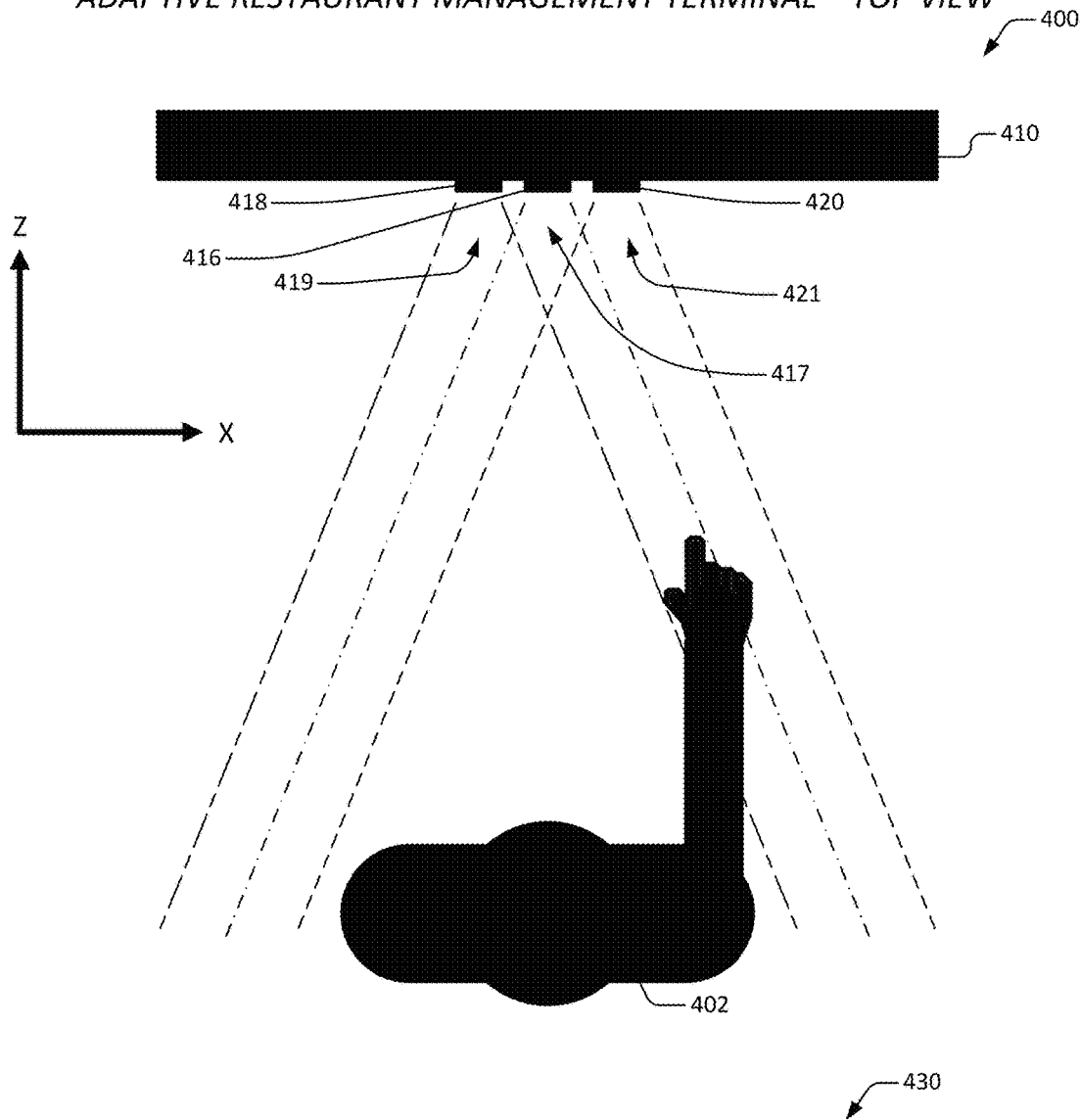
FIG. 4 is a diagram showing a top view of an adaptive restaurant management terminal according to the present invention.

Turning now to FIG. 4, diagram 400 is presented showing a top view of an adaptive restaurant management terminal 410 according to the present invention, such as the terminal 310 of FIG. 3. Similar to those like-named elements of FIG. 3, the diagram 400 depicts an order processor 402 who is responsible for processing orders placed for prepared goods within an establishment, the adaptive terminal 410 that is adjacent to the order processor 402, within viewing range, but not necessarily within arm's reach. The adaptive terminal 410 may be configured in any of the embodiments discussed with reference to FIG. 3 and includes a video camera 418, a motion sensor 420, and a microphone 416.

The camera 418 has a focal length with an image field of view 419 that allows for capture of images of the order processor 402 or another person of interest within the image field of view 419, where the images are suitable for processing by facial recognition algorithms. The microphone 416 has a sensitivity with an audio field of coverage 417 that allows for capture of speech from the order processor 402 or another person within the field of coverage 417, where the captured audio quality is suitable for processing by speech-to-text algorithms. The motion sensor 420 has a sensitivity within a field of coverage 421 that allows for detection and tracking of movement by the order processor 402 or another person within the field of coverage 421. In accordance with the coordinate system shown in FIG. 3, the top view of FIG. 4 depicts the coordinate system having perpendicular X and Z axes in the plane of the page. Thus, the Y axis is perpendicular to the X and Z axes.

The diagram 400 also shows an exemplary command table 430. When movements shown in the swipe direction column of the table 430 are detected, the restaurant management system according to the present invention are interpreted as corresponding commands, which are executed by the KDS 410. For example, when the motion sensor 420 detects a hand swipe in the negative X direction, the restaurant management system interprets the movement as a command to clear a current order. Accordingly, the command is issued to and executed by the KDS 410, thus completing the current order and moving a next order into a current order position, as described above with reference to FIG. 3. Likewise, a movement in the positive Z direction results in a command to the KDS 410 to initiate a cursor and begin following movement of the order processor's hand with the cursor. Two movements in the positive Z direction result in a command to the KDS 410 to select and open an order. Movement in the negative Z direction results in deselection of an order. Other exemplary movements are detailed in the table 430.

Figure 5:
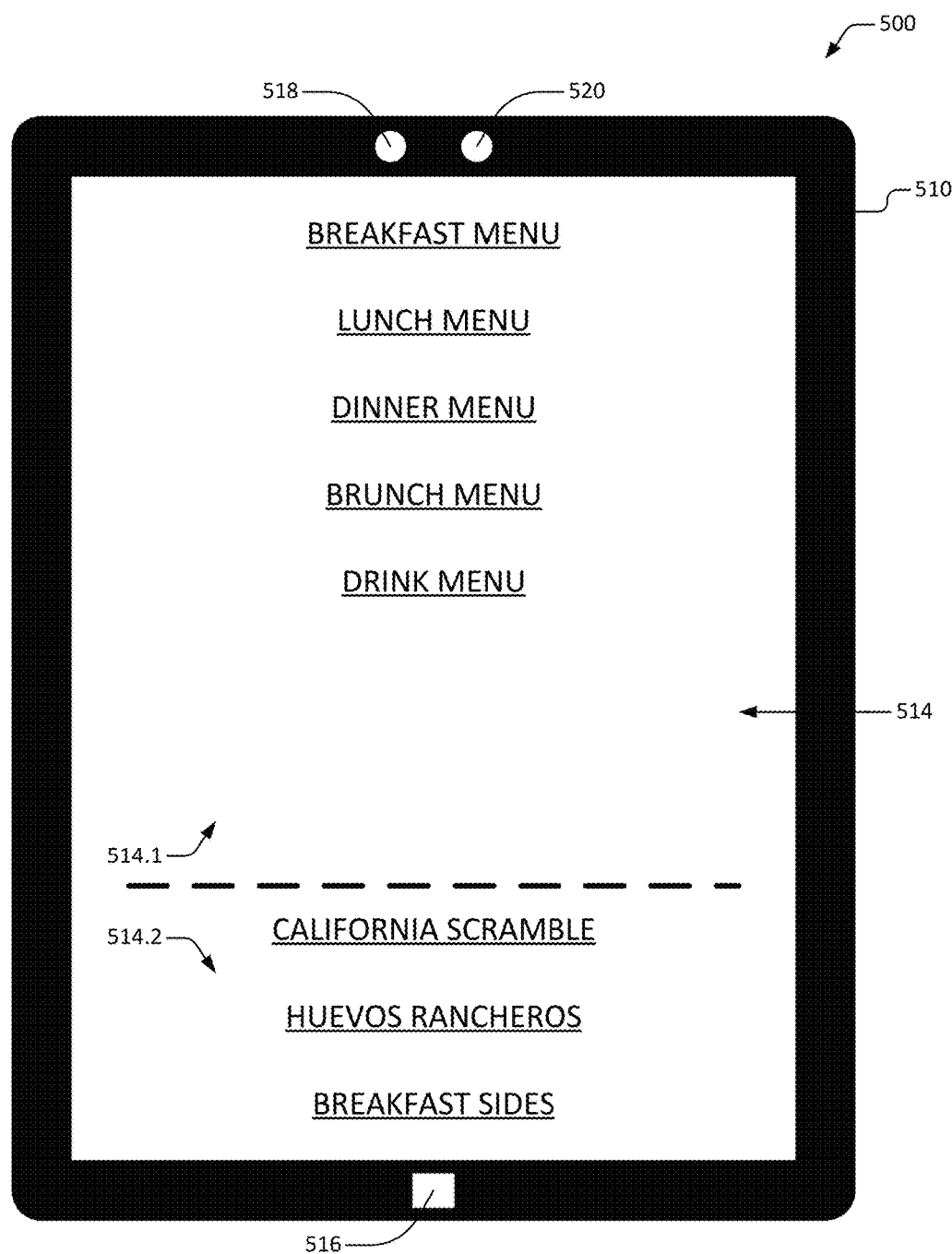
FIG. 5 is a diagram illustrating a restaurant management terminal according to the present invention that provides for intelligent menu assistance.

Now referring to FIG. 5, a diagram 500 is presented illustrating a restaurant management terminal 510 according to the present invention that provides for adaptive menu assistance. Like the terminals 310, 410 of FIGS. 3-4, the terminal 510 in the diagram 500 may comprise a camera 518, a motion sensor 520, and a microphone 516 whose configuration and operation are substantially the same as those like-named elements in FIGS. 3-4. The terminal 510 also has a touchscreen display 514. Preferably, the terminal 510 is employed either by wait staff when configured as a fixed or handheld terminal 510 for taking orders, or by patrons when configured as a fixed or handheld self-ordering kiosk 510. Dimensions of the terminals 510 may vary according to configuration. For example, when configured as a handheld wireless terminal 510, the terminal 510 may comprise an approximately 8-inch Android tablet computer with integrated camera 518 and microphone 516, to which the motion sensor 520 is coupled via a USB port. When configured as a kiosk, the terminal 510 may comprise a 15- or 22-inch tablet as described above, to which the motion sensor 520 is coupled via a USB port. Other dimensions of the terminal 510 are contemplated.

FIG. 5 is illustrates a feature of the present invention that is directed toward acceleration of order entry by either staff or patrons over that which has heretofore been provided. As one skilled in the art will appreciate, electronic terminals 510 typically only display a portion of a menu, primarily because the display area 514 is much smaller than the size required to display a full multi-page restaurant menu. As one skilled in the art will appreciate, there are several present-day techniques that provide for navigation through the menu in order for staff/patrons to make item selections. One technique may employ recognizable page thumbnail images which, when selected, expand to full-size text and images. Another technique merely places full-size text and images in order and the staff/patrons are required to scroll through the text in order to locate and make menu selections. A third technique, shown in the diagram 500, employs hyperlinks (e.g., BREAKFAST MENU, LUNCH MENU, etc.) which, when selected, bring up sub-menu hyperlinks which, when selected, ultimately result in the display of menu items. For example, if staff/patrons select the DINNER MENU hyperlink, sub-menu hyperlinks such as APPETIZERS, ENTREES, DESSERTS, and DRINKS may be displayed. Upon further selections, ultimately menu items (e.g., 16-Ounce Ribeye) are displayed for order entry. The present inventors note that navigation to menu items by any of the above noted techniques is onerous and annoying at best, but in addition adds time and confusion to the order entry process.

Accordingly, the present invention provides for recognition and interpretation of a limited dictionary of menu keywords via speech-to-text algorithms and processing within the terminal 510 to quickly navigate to those menu items or other sub-menus that present a high probability of being selected. Thus, the display area 514 is divided into a primary menu display area 514.1 and an accelerated suggestion area 514.2. As the order process begins, the diagram 500 shows the results of recognition and interpretation of the word "eggs," and thus the restaurant system, as described in further detail below, displays two suggested menu items (CALIFORNIA SCRAMBLE and HUEVOS RANCHEROS) along with a suggested hyperlink for breakfast sides. Advantageously, accelerated menu navigation according to the present invention provides for significant improvements in the order entry process and customer satisfaction.

The present inventors also note that examples abound for acceleration of the process via speech-to-text and use of a limited keyword dictionary. For instance, "I don't like red wine" and "I only drink French wines," would result in the elimination of multiple sub-menu steps, thereby quickly navigating to wine selections that are appropriate. Other examples that cut through multiple hyperlink traversals include:

"I want a cheeseburger and fries."
"I'm gluten free."
"We are interested in the specials."
"Do you have a chopped salad?"

As one skilled will appreciate, the provision of recognition and interpretation of a limited dictionary of keywords radically changes the order processing experience, both for staff and patrons in an establishment. In addition to the menu assist portion of the display 514.2, the terminal 510 may also be configured to utilize the motion sensor 520 to detect hand/finger movements of a user to make menu selections from the suggested items in the display area 514.2. Use of gestures, accordingly, provides advantages in that a user may place an order via speech and/or 3D gestures, without ever coming into physical contact with the terminal 510. Such a configuration may be preferable during, say, cold season or flu season, because the means for transmission of germs are decreased in number.

Figure 6:
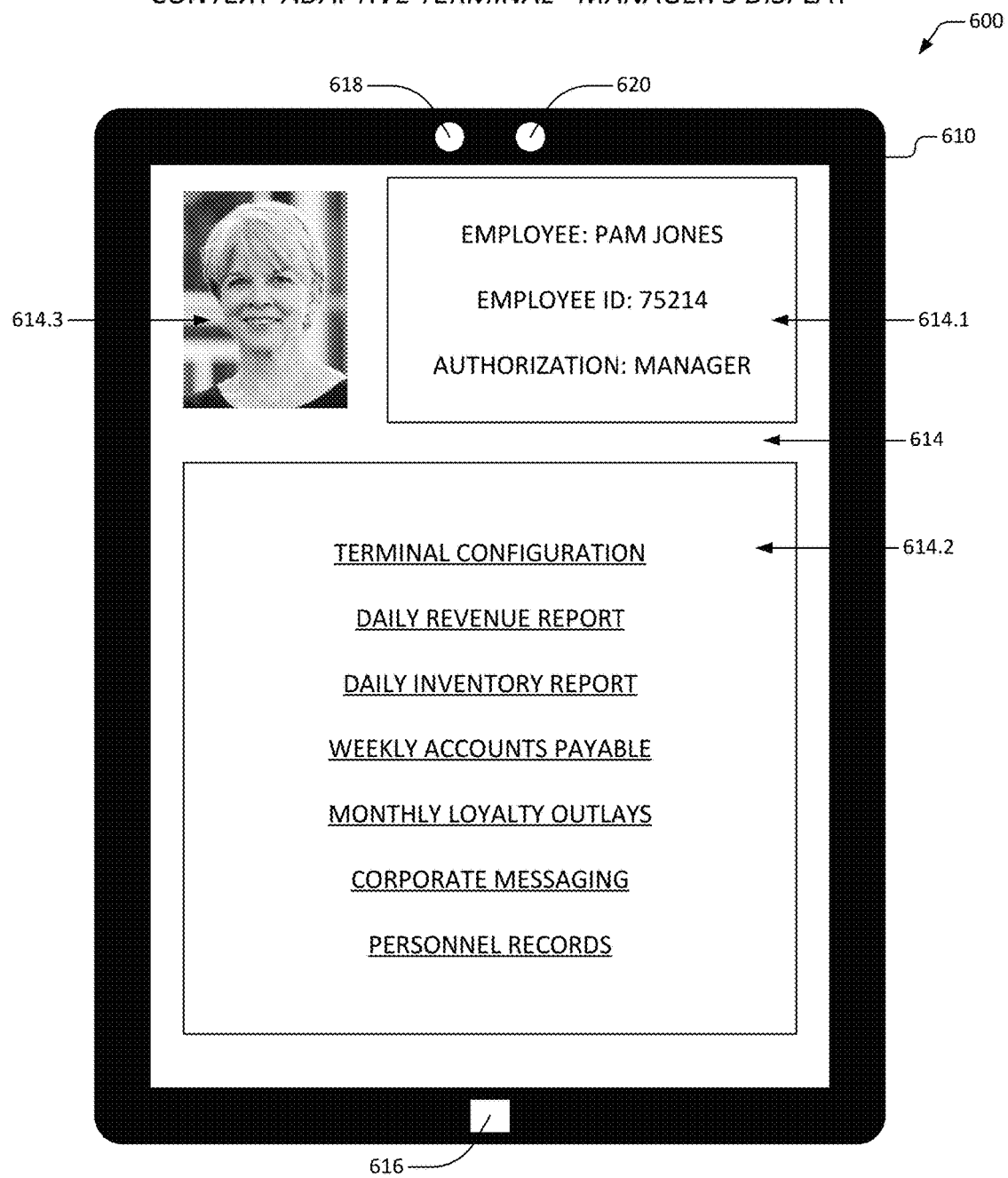
FIG. 6 is a diagram detailing a context-adaptive terminal according to the present invention that features an exemplary manager's display.
Figure 7:
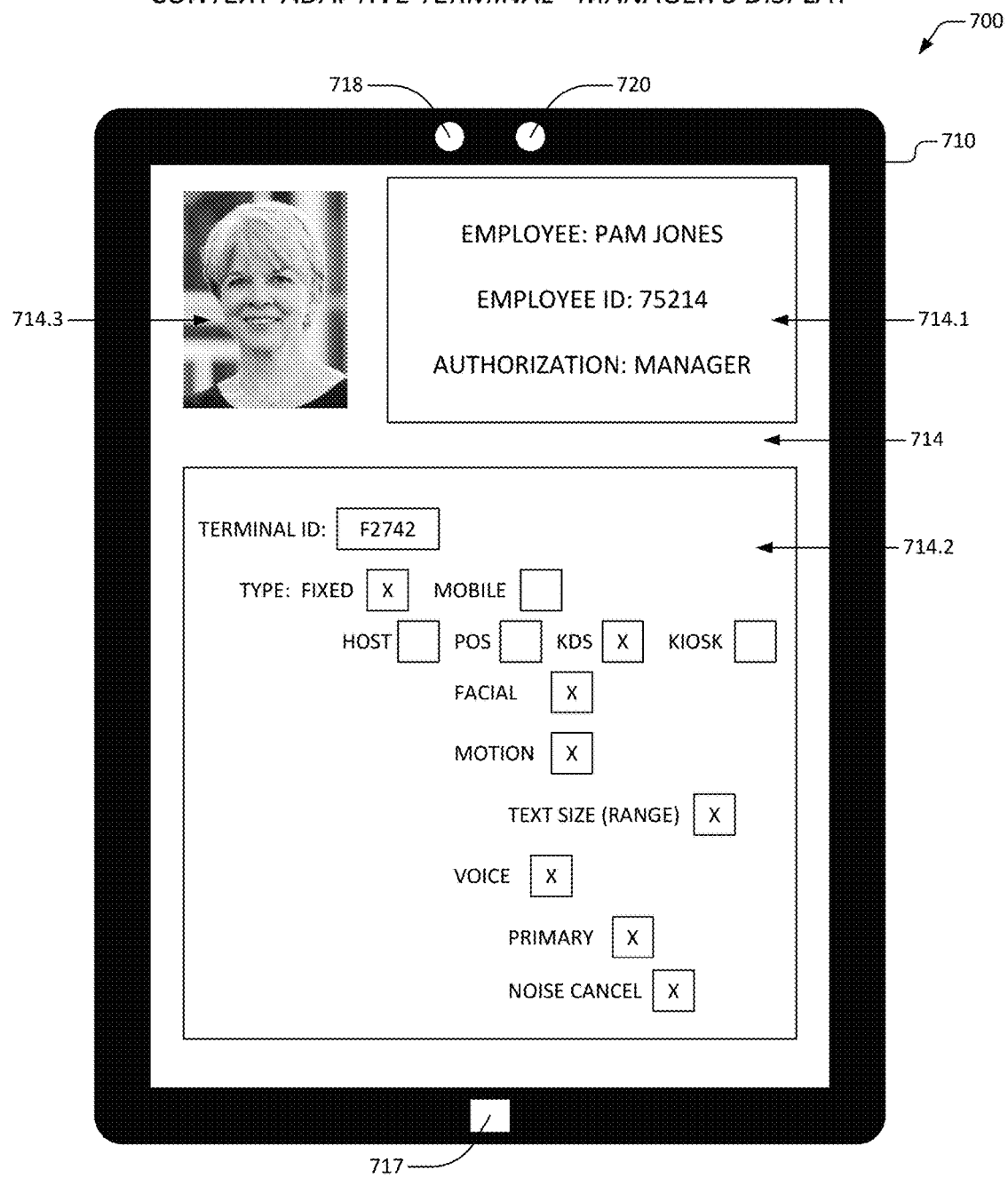
FIG. 7 is a diagram showing a terminal configuration screen on a context-adaptive terminal according to the present invention.
Figure 8:
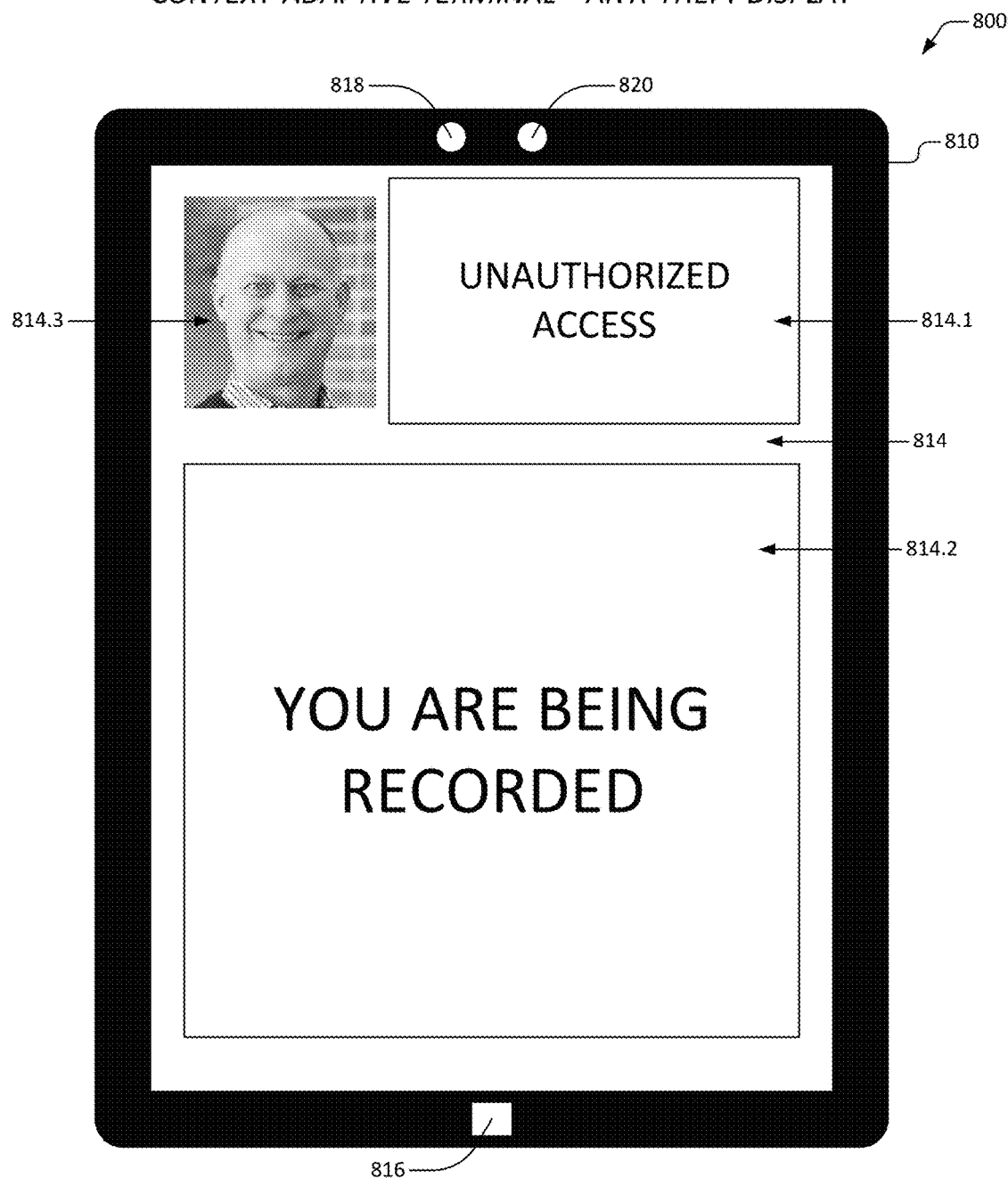
FIG. 8 is a diagram illustrating a context-adaptive terminal according to the present invention that features an exemplary anti-theft display.

While FIGS. 3-5 illustrate applications of the present invention that employ interpretation of voice and 3D gestures to improve the order processing experience, FIGS. 6-8 show how the addition of facial recognition techniques enable terminals—both fixed and mobile—to rapidly adapt context for the execution of functions by a terminal to comport with a recognized or unrecognized user.

Referring to FIG. 6, a diagram 600 detailing a context-adaptive terminal 610 according to the present invention that features an exemplary manager's display. The discussion with reference to FIGS. 3-5 focused primarily on utilization of 3D gestures and speech recognition to command a terminal 310, 410, 510 according to the present invention to perform certain actions, whether configured as a KDS 310, 410 or an order entry terminal 510. Another object of the present invention is to enable automatic contextual configuration of a terminal 310, 410, 510 by utilizing facial recognition techniques, described in further detail below, to identify registered users and to configure displays and control features of the terminal 310, 410, 510 in accordance with their intended usage of the terminal 310, 410, 510.

Like the terminals 310, 410, 510 of FIGS. 3-5, the terminal 610 in the diagram 600 may comprise a camera 618, a motion sensor 620, and a microphone 616 whose configuration and operation are substantially the same as those like-named elements in FIGS. 3-4. The terminal 610 also has a touchscreen display 614. The terminal 610 may be employed either by wait staff when configured as a fixed or handheld terminal 610 for taking orders, or by patrons when configured as a fixed or handheld self-ordering kiosk 610, or by order processing staff when configured as a KDS 610.

Dimensions of the terminals 610 may vary according to configuration. For example, when configured as a handheld wireless terminal 610, the terminal 610 may comprise an approximately 8-inch Android tablet computer with integrated camera 618 and microphone 616, to which the motion sensor 620 is coupled via a USB port. When configured as a kiosk or KDS, the terminal 610 may comprise a 15- or 22-inch tablet as described above, to which the motion sensor 620 is coupled via a USB port. Other dimensions of the terminal 610 are contemplated.

In any of the above configurations, facial recognition techniques may be employed to identify a user and to configure displays and controls that correspond to the user's primary functions. In operation, when the terminal 610 is put into service, upon initialization, the terminal 610 may employ the camera 618 to capture an image of the user and employ facial recognition techniques to adapt the displays and controls provided to comport with the user's function. In one embodiment, the image may be captured and identified upon power up of the terminal 610. In another embodiment, touch screen options may be provided on all displays 314, 414, 514, 614 that, when executed, direct the terminal 310, 410, 510, 610 to capture an image of the user and employ facial recognition techniques to change the displays and controls previously provided to comport with the user's function.

In one embodiment, the displays and controls of the terminal 310, 410 may result from recognition of the order processor 302, 402 along with their function. Accordingly, upon initialization, the KDS 310, 410 captures and identifies an image of the order processor 302, and configures the terminal 310, 410 as a KDS terminal 310, 410. Based upon the role of the order processor 302, 402 (e.g., grill master, salad station, pasta station, etc.), the KDS 310, 410 may further tailor menu entries XXX, YYY, ZZZ on the electronic orders 308 to comport with the user's role. For example, if menu item XXX corresponds to a salad, and the user 302, 402 is identified as a grill master, then the menu item XXX is not displayed; only menu items corresponding to work required of the grill master are displayed. Likewise, 3D gestures and/or voice controls may be enabled or disabled in accordance with preferences that are preconfigured for employment of the terminal 310, 410 according to the role of the user 302, 402.

In similar manner, facial identification of another user may result in the terminal 510 as discussed with reference to FIG. 5 (including voice controls), when that user is recognized in their role as a waiter.

The diagram 600 shows a display/control configuration resulting from recognition of a captured image of an employee having management functions and privileges. Accordingly, upon initialization (or via direct command), the terminal 610 directs the camera 618 to capture and recognize the user's image, which is shown in display area 614.3. Area 614.1 shows the user's credential's and area 614.2 shows an exemplary manager's display with hyperlinks to functions routinely performed by a manager such as reviewing revenue reports, inventory reports, accounts payable, personnel records, etc. Additionally, presuming that only managers are allowed to configure a terminal 310, 410, 510, 610, the area 614.2 also shows a hyperlink to a terminal configuration function which, when selected, results in the terminal configuration shown in FIG. 7. As with all of the terminals 310, 410, 510 discussed above, the terminal 610 shown in the diagram may be configured to employ speech and/or 3D gestures as well to accelerate performance of managerial functions.

Turning now to FIG. 7, a diagram 700 is presented showing a terminal configuration screen on a context-adaptive terminal 710 according to the present invention. As noted above, such an exemplary display 714 results from a manager executing the TERMINAL CONFIGURATION hyperlink shown in FIG. 6. Like the terminals 310, 410, 510, 610 of FIGS. 3-6, the terminal 710 in the diagram 700 may comprise a camera 718, a motion sensor 720, and a microphone 716 whose configuration and operation are substantially the same as those like-named elements in FIGS. 3-6. The terminal 710 also has a touchscreen display 714. Accordingly, the manager's image is shown in display area 714.3, the manager's credentials are shown in display area 714.1, and a terminal confirmation form is shown in display area 714.2. Therein, the manager may provide information for configuration of any of the terminals 310, 410, 510, 610, 710 used in the establishment. Thereafter, the terminals 310, 410, 510, 610, 710 may receive the information as will be discussed below and reconfigure upon initialization or direct reconfiguration command. The exemplary display area 714.2 allows the manager to enter a terminal identification number (shown as F2742. Likewise, terminal F2742 may be configured to operate in a fixed or mobile mode, and default function of terminal F2742 may be configured as a host terminal (used in restaurants to route patrons to tables and to assign wait staff for service), a point-of-sale (POS) terminal (used for order entry and payment), a KDS (used by an order processor to prepare orders), or a kiosk (a terminal whereby patrons directly place orders). Terminal F2742 may further be configured to utilize any combination of 3D gestures, facial recognition, and voice commands. When 3D gestures ("MOTION") are enabled, Terminal F2742 may furthermore be configured to adjust the size of text displayed to the user as a function of the user's distance from the terminal, as determined by the motion sensor. When voice commands are enabled, terminal F2742 may moreover be configured as a primary input for voice commands, as a background audio source that is employed for noise cancellation, or both as a primary input for voice commands and a background audio source. Clearly, as one skilled in the art will appreciate, configuration of any of the terminals 310, 410, 510, 610, 710 discussed herein may involve other settings as well, and the terminals 310, 410, 510, 610, 710 may have configuration that is initialized by default.

Though terminals 310, 410, 510, 610, 710 may be configured to employ facial recognition identify authorized users and registered patrons, another adaptive configuration contemplates detection of unauthorized users and adaptation of functions of the terminals 310, 410, 510, 610, 710 to preclude damage and theft. A terminal 810 thus configured is shown in the diagram 800 in FIG. 8. Like the terminals 310, 410, 510, 610, 710 of FIGS. 3-7, the terminal 810 in the diagram 800 may comprise a camera 818, a motion sensor 820, and a microphone 816 whose configuration and operation are substantially the same as those like-named elements in FIGS. 3-7. The terminal 8710 also has a touchscreen display 814. Recall that when a terminal 310, 410, 510, 610, 710 is initialized or directly commanded, the camera 818 captures and image of a user. If the user is recognized, the terminal 810 is configured to function according to the user's role. However, if the user is not recognized, the configuration of the terminal 810 may automatically adapted to any of a number of other modes. For instance, if the user is not recognized during operating hours, the terminal 810 may just temporarily disable voice command or 3D gestures and may furthermore disable input to the terminal via touch. The diagram 800 show an exemplary configuration that may be employed when the establishment is closed for purposes of precluding tampering or theft. Accordingly, in this mode, the motion sensor 820 may be enabled and, when movement is detected, the terminal 810 may direct the camera 818 to capture one or more images of an unauthorized user, which is shown in display area 814.3. Display area 814.1 may be employed to show a message (UNAUTHORIZED ACCESS) to get the attention of the unauthorized user, and display are 814.2 may be employed to flash a message to the unauthorized user to preclude tampering and/or theft. As will be discussed in more detail below, upon detection of the unauthorized user, other terminals within the establishment may be configured to perform related security functions such as, but not limited to, recording stills or video, tracing movement, flashing messages, recording audio, etc. Advantageously, the adaptive terminals 310, 410, 510, 610, 710, 810 according to the present invention provide for functions substantially beyond mere processing of order, resulting in safer, more secure work environments.

Although elements and operation of the terminals 310, 410, 510, 610, 710, 810 has been discussed above, a primary objective of the discussions with reference to FIGS. 3-8 has been to teach how adaptive terminals according to the present invention may be used under a number of different configurations. Attention is now directed to FIGS. 9-12 where design details of an adaptive restaurant management system according to the present invention are now presented.

Figure 9:
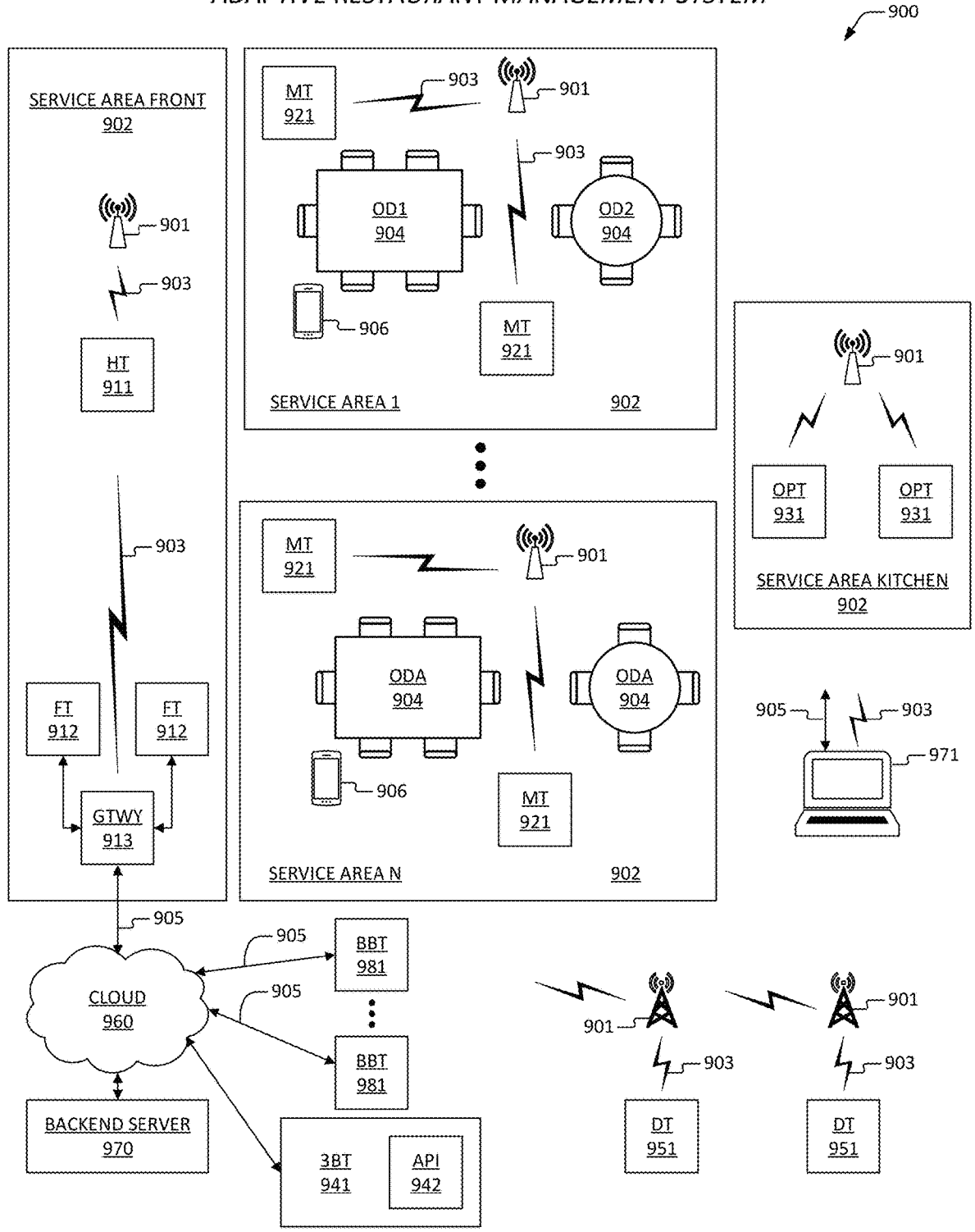
FIG. 9 is a block diagram depicting an adaptive restaurant management system according to the present invention.

Referring now to FIG. 9, a block diagram is presented depicting an adaptive restaurant management system 900 according to the present invention. The system 900 may include one or more service areas 902, such as a front service area 902, service area 1-service area N 902, and service area kitchen 902. As alluded to above, the present inventors reiterate that though the present invention is applicable to any type of retail establishment, a restaurant establishment is herein primarily employed in order to teach relevant aspects of the present invention.

The service areas 902 may comprise one or more wireless access points 901. The service areas 902 may also comprise one or more wireless POS terminals 911, 921, 931, coupled to the access points 901 via wireless links 903, and which are distinguished in the system 900 as a host terminal 911, mobile terminals 921, and order processing terminals 931 (also referred to as KDSs 931). The service areas 902 may further comprise a gateway 913 to which is coupled one or more fixed hardwired terminals 912, and which provides for coupling of the fixed terminals 912 and access points 901 to an internet cloud 960 via conventional wired links 905 such as, but not limited to, Ethernet, cable, fiber optic, and digital subscriber line (DSL) As part of the network path to and through the cloud 960, providers of internet connectivity (e.g., ISPs) may employ wireless technologies from tower to tower, etc., but for purposes of this application, such links 905 will be referred to as conventional wired links 905 to distinguish them from local and cellular wireless links 901. The wireless links 903 may comprise, but are not limited to, Wi-Fi, Bluetooth, near field communications, infrared links, IEEE 802.15.4, Zigbee radio links, and cellular based links (e.g., 3G, 4G, LTE) or a combination of the noted links. The POS terminals 911, 912, 921, 931 may be adaptively configured to comport with intended function (i.e., host seating, order and payment entry, order fulfillment, etc.) as described above with reference to FIGS. 3-8, and their assistive features (e.g., facial recognition, voice commands, motion sensing, keyword recognition and menu assist) may be enabled/disabled via any one or more of the techniques discussed above with reference to FIGS. 3-8. In one embodiment, the mobile terminals 921 may comprise a touch screen display, camera, motion sensor, microphone, and integral payment processor (e.g., card/chip reader) that provides for both order entry, display of order status, and payment processing. As such, the host terminal 911, fixed terminals 912, and KDSs 931 may comprise larger touch screens to allow for easier viewing by restaurant staff along with camera, motion sensor, and microphone, or they may comprise displays with keyboard entry and separately connected camera, motion sensor, and microphone. In one embodiment, terminals 911, 912, 931 may comprise desktop computers, laptop computers, smartphones, or tablets that are executing application programs or web-enabled application programs that provide for communication with a background server 970 for purposes of order entry, status updates, configuration, facial recognition, speech-to-text processing and, optionally, payment processing.

The background server 970 is coupled to the internet cloud 260, and to an administrative console 971 via a conventional wired link 905 and/or a wireless link 903. The background server 970 is not on-premise and is thus also referred to herein as a cloud server 970. The administrative console 971 may be disposed within the restaurant premises and coupled to the background server 970 via the links 903, 905, or the console 971 may be disposed in another location, say, at an operations headquarters for multiple restaurants within a given region. In addition, the system 900 may comprise one or more browser-based terminals 981 that are coupled to the background server 970 via links 905. In one embodiment, the browser-based terminals 981 may comprise desktop computers, laptop, computers, smartphones, or tablets that are running stand-alone applications or web-enabled applications that provide for communication with the background server 970 for purposes of order entry, status updates, and optionally, payment processing.

The system 900 may further comprise one or more third-party-based terminals 941 that are coupled to the background server 970 via the conventional links 905 though the cloud 960. The third party-based terminals 941 may comprise desktop computers, laptop, computers, smartphones, or tablets that are running stand-alone third-party applications or web-enabled third-party applications that provide for communication with the background server 970 for purposes of order entry, status updates, and optionally, payment processing via a proprietary application programming interface (API) 942. An example of such a terminal 941 may include the well-known GrubHub third-party application that is configured to communicate with the background server 970 via the API 941.

The system 900 may further comprise one or more delivery terminals 951 that are coupled to one or more cellular access points 901 via conventional cellular wireless links 903, and the cellular access points 901 are coupled to the background server 970 via the cloud 960. In one embodiment, the delivery terminals 951 are substantially similar to the mobile terminals 921 in form and function, and that are configured to provide services for order entry, status updates, order fulfillment (i.e., delivery), and payment processing. In another embodiment, the delivery terminals 951 are disposed as smartphone or tablets with integrated camera and microphone, and with detachable motion sensor and payment processor (e.g., card/chip reader). In a further embodiment, the delivery terminals 951 are disposed as smartphone or tablets with camera, microphone, motion sensor, and payment processor integrated within a single housing. Other embodiments are contemplated.

Service areas 902 corresponding to the mobile terminals 921 may have one or more tables 904 corresponding to one or more orders. For clarity, service area 1 902 depicts two tables 904, one of which corresponds to order 1 OD1, and the other of which corresponds to order 2 OD2. The mobile terminals 921 within service area 1 902 may processes portions of both orders 1 OD1 and order 2 OD2.

Service area N 902 depicts two tables 904, both of which correspond to order A ODA. The mobile terminals 921 within service area N 902 may both process portions order A ODA.

Though disposed within separate service areas (service area 1 902-service area N 902), the mobile terminals 921 therein may be further configured to process portions of any and all orders within the restaurant and may roam from service area 902 to service area 902 to support work load of the restaurant.

The order processing terminals 931 may process all orders in the restaurant, or they may be configured to each process a portion of all of the orders in the restaurant according to their role (e.g., salad preparation station, fry cook station, inventory station, etc.).

The host terminal 911 and fixed terminals 912 may be configured to process all orders in the restaurant to provide for on-premise seating assignment, order initiation, order selection, and payment processing, including closeout of orders.

One or more restaurant staff members (not shown) within service area 1 902-service area N 902 may have a personal device (e.g., smartphone, tablet, laptop) 906 that can provide an ad hoc network (i.e., hotspot) to which one or more of the mobile terminals 921 may tether for purposes of communicating with the backend server 970 in the absence of Wi-Fi connectivity to the access points 901.

In one embodiment, operations are initiated when the one or more patrons enter the restaurant. Generally, a host (not shown) will create an order (along with corresponding order identifier (OID) via the host terminal 911 for the one or more patrons and will seat the patrons at one or more tables 904. The created order may include service area designation and assignment of the order to one or more mobile terminals 921. In another embodiment, mobile terminals 921 within a service area 902 are assigned to all orders within that service area 902. Other embodiments are contemplated. The created order and service area assignment are transmitted over the cloud 960 to the backend server 970, which maintains durable terminal queues within which are stored order updates for all orders in the restaurant. Each of the durable queues correspond to each of the terminals 911, 912, 921, 931, 951 within the system 900. When connection status to a given terminal 911, 912, 921, 931, 951 is down (i.e., the server 970 cannot verify communication with the given terminal 911, 912, 921, 931, 951), then the server 970 maintains the order updates for that terminal 911, 912, 921, 931, 951 until connectivity is reestablished, at which time the server 970 may transmit one or more of the order updates to the terminal 911, 912, 921, 931, 951, verifying with each transmission that the terminal 911, 912, 921, 931, 951 received the update. Advantageously, each of the terminals 911, 912, 921, 931, 951 is capable of processing portions of any of the orders in the restaurant.

Likewise, each of the terminals 911, 912, 921, 931, 951 maintains durable order queues within which are stored order updates only for each of the orders being processed by the terminal 911, 912, 921, 931, 951. Each of the terminals 911, 912, 921, 931, 951 also maintains a plurality of order states that depict a current state for each of the orders in the restaurant. As a seated patron selects one or more menu items, wait staff enters the menu items as an update in one of the terminals 911, 912, 921, 931, 951, generally a mobile terminal 921 assigned to the given service area 902. The order update is entered into one of the durable order queues that corresponds to the order ID. If connectivity if present, then the terminal 911, 912, 921, 931, 951 transmits the order update to the server 970 and waits for the server 970 to acknowledge the order update. If acknowledged, the terminal 911, 912, 921, 931, 951 removes the order update from the one of the durable order queues. If unacknowledged (i.e., in the case of non-persistent network connectivity), the terminal 911, 912, 921, 931, 951 maintains the order update in the one of the durable order queues until such time as connectivity is reestablished, and the terminal 911, 912, 921, 931, 951 completes transmission of the order update with acknowledgement by the server 970.

Upon reception of a particular update from the server 970, the terminals 911, 912, 921, 931, 951 may check one of their plurality of order states that correspond to the particular update for conflicts, as will be described in further detail below. If a conflict exists, the terminals 911, 912, 921, 931, 951 may utilize domain specific rules to resolve the conflict in order to establish a valid order state. Each of the 911, 912, 921, 931, 951 is configured with the same domain specific rules to provide for consistent resolution of order states.

As patrons continue to order items corresponding to the order ID, the one or more of the terminals 911, 912, 921, 931, 951 may enter the order updates and transmit/durably queue the order updates to the server 970 in accordance with connectivity conditions. The server 970 may also queue/ transmit order updates for all orders in the restaurant to each of the terminals 911, 912, 921, 931, 951 according each terminal's connectivity. Order fulfillment, payment, and closeout are likewise handled as order updates through the server 970 and are queued/transmitted to all of the terminals 911, 912, 921, 931, 951 in accordance with the connection status of each terminal. Delivery terminals 951 may not be on premise at the time an order is placed; however, the system 900 according to the present invention may treat the delivery terminals 951 as if they are virtually on premise, assigning them to a virtual on-premise service area 902.

Patrons outside of the restaurant are also handled in similar fashion via the browser-based terminals 981, and third-party terminals 941, though without feedback from the server 970 regarding all orders in the restaurant. When accessed through the browser-based terminals 981 and third-party terminals 941, the server 970 creates and order ID and assigns it to one of the order processing terminals 931 for fulfillment, while sending status updates on the order ID to all of the terminals 911, 912, 921, 931, 951 via the durable terminal queues therein. The server 970 may designate a specific delivery terminal 951 for pickup, delivery, and payment based upon proximity to the restaurant, or based upon workload corresponding to the delivery terminal 951.

The administrative console 971 may maintain a master record of all order states and order updates according to all of the terminals 911, 912, 921, 931, 951 in order to provide for restaurant management, maintenance, analytics, and network traffic analyses. The console 971 may alternatively be disposed in an expediter's area of the restaurant for use by expediters in assignment and allocation of patron seating and terminals 911, 912, 921, 931, 951.

The durable terminal queues and durable order queues may be disposed as non-transitory battery backed random-access memory, electrically-erasable programmable read-only memory, solid state memory, hard disk memory, or a combination of the above that will provide for maintaining order updates within the queues across network and power interruptions.

Advantageously, the present invention provides for more efficient performance of computational resources within the server 970 and the terminals 211, 911, 912, 921, 931, 951 over that which has heretofore been provided because multiple terminals 911, 912, 921, 931, 951 may be assigned to process portions of a single order, resulting in more timely processing of the single order. Similarly, any of the terminals 911, 912, 921, 931, 951 in the restaurant may be immediately reassigned to a particular order to replace a malfunctioning terminal or to increase throughput of the server 970. Likewise, each of the terminals 911, 912, 921, 931, 951 may be configured as disclosed above with reference to FIGS. 3-8 to adapt to operational context of a recognized (or unrecognized) user, and they may furthermore be enabled to accelerate order entry and processing through the employment of facial recognition, 3D gestures, or voice commands, or a combination of facial recognition, 3D gestures, and voice commands. The terminals 911, 912, 921, 931, 951, may further be configured to accelerate order entry and processing by performing voice recognition of selected menu keywords, which provide for high probability suggestions for menu items, as is discussed above with reference to FIG. 5. Accordingly, computational resources 911, 912, 921, 931, 951, 970 within the system 900 are afforded an overall performance improvement as a result of acceleration of the order entry and processing process, elimination of tedious drill-down sub-menu hyperlinks, recognition of users and patrons along with automatic adaptation of functions according to role. Reliability and maintainability of terminals 911, 912, 921, 931, 951 for use in areas having conditions that are detrimental is increased via enablement of non-touch 3D gestures.

Figure 10:
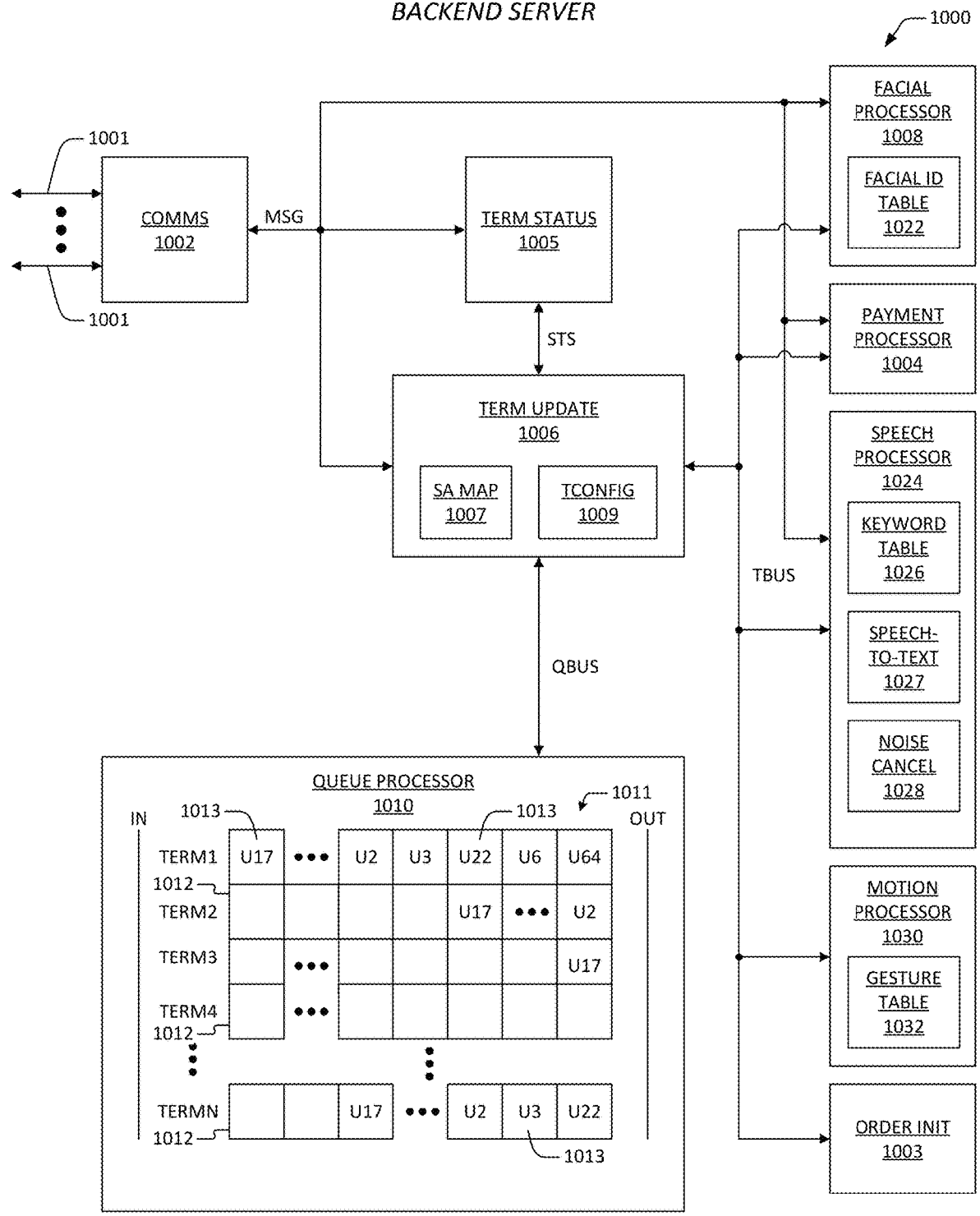
FIG. 10 is a block diagram featuring a backend server according to the present invention.

Now turning to FIG. 10, a block diagram is presented featuring a backend server 1000 according to the present invention, substantially similar to the server 970 of FIG. 9. The server 1000 may comprise communications circuitry COMMS 1002 (e.g., transceivers, modems, message formatter, etc.) that is coupled to one or more wired or wireless communications links 1001, examples of which are described above with reference to FIG. 9. The server 1000 may also comprise a terminal status element 1005, a terminal update element 1006, a facial processor 1008, a payment processor 1004, and a speech processor 1024, all of which are coupled to COMMS 1002 via a message bus MSG. The terminal status element 1005 is coupled to the terminal update element 1006 via a status bus STS. The terminal update element 1006 may comprise a service area map SA MAP 1007 and a terminal configuration table 1009. The terminal update element 1006 is coupled to the facial processor 1008, the payment processor 1004, the speech processor 1024, a motion processor 1030, and an order initiation element 1003 via a terminal bus TBUS. The terminal update element 1006 is also coupled to a queue processor 1010 via a queue bus QBUS.

The queue processor 1010 may include a durable terminal queue 1011 that includes terminal update records 1012, each of which are associated with a corresponding terminal, such as the terminals 911, 912, 921, 931, 951 discussed with reference to FIG. 9, that is employed within a given restaurant. In the embodiment of FIG. 10, N terminal update records 1012 are shown, each associated with a corresponding one of N terminals for the given restaurant. In a large restaurant or big box environment, N may be roughly equal to 100 terminals, though larger and smaller numbers are contemplated.

Each of the terminal update records 1012 may comprise update fields 1013, which are employed to queue order updates for transmission to each of the corresponding terminals as connectivity to the corresponding terminals permits. Update fields 1013 nearest to OUT are the oldest order updates queued for transmission to the corresponding terminals. Update fields 1013 nearest to IN are youngest (or most recent) order updates queued for transmission to the corresponding terminals. Fields 1013 between the oldest order updates and the youngest order updates descend in age from oldest to youngest update according to when those updates are received from others of the corresponding terminals.

Values of the order update fields 1013 may include, but are not limited to, an order ID along with order details taken by the others of the corresponding terminals. Accordingly, the terminal update record 1012 for terminal 1 TERM1 depicts a plurality of order update fields 1013 to be transmitted to TERM1 when connectivity is reestablished with TERM1. In decreasing age from oldest to youngest order update, the fields 1013 depict updates to order 64 U64, then order 6 U6, then order 22 U22, and so on, culminating with an update to order 17 U17. As one skilled in the art will appreciate, the terminal update record 1012 for TERM1 is indicative that TERM1 has been offline (i.e., no connectivity) longer than any of the other terminals in the restaurant. This length of time may correspond to a mobile terminal that is serving a party on a restaurant porch that has poor Wi-Fi connectivity, or may correspond to a delivery terminal that is traversing an area with poor cellular coverage. The terminal update records 1012 corresponding to TERM2, TERM 3, and TERMN depict a number of populated order update fields 1013 less than the number of fields for TERM1, which may correspond to terminals within the restaurant that have only slightly intermittent connectivity. And the terminal update record for TERM4 contains only empty order update fields 1013, thus indicated that this terminal is up to date on all order state changes within the restaurant.

Operationally, the terminal status element 1005 may periodically transmit a first message to each of the terminals and update the connectivity status of the terminals based upon whether they acknowledge the first message or not. In one embodiment, the first message may comprise a ping message. In one embodiment, acknowledgment may comprise a simple acknowledge message. In other embodiments, acknowledgement may comprise additional data such as received signal strength indication RSSI, number of hops, or Global Positioning System (GPS) coordinates. The acknowledge message may further comprise configuration identification data such as mode (e.g., mobile order entry, KDS, kiosk, management terminal) and order accelerator features (e.g., 3D gestures, voice commands, facial recognition, menu assist, etc.).

The terminal status element 1005 may provide connectivity status of each of the terminals to the terminal update element 1006 via bus STS. The service area map 1007 is a table that associates each of the terminals to one or more service areas within the restaurant. In one embodiment, the terminal update element 1006 may generate order update messages from oldest to youngest update for each of the terminals that are connected. Connectivity is maintained when a terminal acknowledges receipt of an order update message. Once acknowledged, the terminal update element 1006 directs the queue processor 1010 to delete the oldest order update for that terminal and shift pending order updates so that the next oldest order update becomes the oldest order update. In one embodiment, order updates are transmitted to a given terminal until its terminal update record 1012 is empty, or until connectivity is broken.

In one embodiment, all of the terminals associated with the restaurant are updated by the terminal update element 1006. In an alternative embodiment, terminals are selectively updated in accordance with their mapping to the one or more service areas, as indicated by contents of the service area map 1007. For example, delivery terminals may only require knowledge of orders that are to be delivered outside the restaurant, and thus they may be mapped to a "delivery" service area so that order updates that correspond to the delivery service area are transmitted to the delivery terminals. Similarly, the restaurant or retail establishment may be so large that management dedicates certain terminals to designate service areas. Accordingly, all of the terminals in a given service area may be employed to update any order placed within the given service area, but they may not be employed to update orders placed outside of the given service area.

The terminal update element 1006 may also include a terminal configuration table 1009, which contains records for each of the terminals in the system 1000. The records indicate a default configuration for each of the terminals along with their current configuration and features, the terminal configuration table 1009 may be accessed as required other elements of the system over TBUS. For terminals that employ 3D gestures, the terminal configuration table 1009 also provides a mapping of 3D gestures to terminal commands. For example, the table 1009 may indicate that a swipe left results in a terminal command to complete a current order and display a next order.

Messages received from the communications circuit 1002 may also require additional functions to be performed by the backend server 1000. For example, when orders are placed by a browser-based or third-party based terminal, the terminal update element 1006 may transmit the order update to the order initiation element 1003 via TBUS. The order initiation element 1003 may then create an order ID for the order update and may assign the order ID to one or more of the terminals within the restaurant. Similarly, when an order update message received over the COMMS 1002 requires processing of transactions outside of the terminals' capabilities (e.g., financial transactions with credit card providers, loyalty card discounts, etc.), the payment processor 1004 may generate messages to complete the transactions and the messages are transmitted via COMMS 1002. The payment processor 1004 may further generate order updates (e.g., "order paid," "payment source 1 approved," "discount amount," etc.) to be transmitted to the terminals and may provide these updates to the terminal update element 1006 via TBUS. The terminal update element 1006 may then provide those updates to the durable queue 1011 via QBUS, and the updates are transmitted to the POS terminals in due course dependent upon connection status, as is described above.

Messages received from the communications circuit 1002 may comprise captured images or electronic representations thereof, which are routed to the facial processor 1008. The facial processor 1008 may comprise a facial ID table 1022 that comprises a mapping of captured images to authorized users and registered patrons as discussed above. The facial ID table 1022 may also include a default terminal configuration, including adaptive features (e.g., 3D, voice commands, menu assist) for each of the authorized users. Accordingly, the facial processor 1008 may generate messages designated for one or more terminals that correspond to a given captured image, indicating recognition or non-recognition of a user/patron corresponding to the captured image. The facial processor 1008 may further generate messages to designated terminals that correspond to a recognized user that directs the designated terminals to change their configuration to comport with user requirements (e.g., change to KDS configuration, enable voice commands, etc.). Portions of the facial processor 1008 may alternatively utilize internet-based 3rd party facial recognition services, which are accessed and employed via messages generated by the facial processor 1008 and provided to COMMS 1002 via MSG. Accordingly, when a captured image is received, the facial processor 1008 may generate messages over MSG that are transmitted to the 3rd party facial recognition services that include the captured image and requesting identification. The facial processor 1008 may further receive messages from the 3rd party facial recognition services that designate an ID that corresponds to the captured image. The ID is then employed as an index into the facial ID table 1022 to retrieve the user's default terminal configuration. The facial processor 1008 may additionally generate messages to one or more designated terminals that include the default configuration.

Messages received from the communications circuit 1002 may additionally comprise audio that has been captured by one or more terminals, which are routed to the speech processor 1024. The speech processor 1024 then provides the audio to a speech-to-text element 1027 and optionally to a noise cancellation element 1028. If the audio corresponding to the one or more terminals is to be employed for noise cancellation purposes, the noise cancellation element 1028 may subtract the audio from audio received from surrounding terminals prior to processing by the speech-to-text element 1027. The speech-to-text element 1027 converts audio signals/files to text signals/files and provides the text signals/files to a keyword table 1026. The keyword table 1026 is a dictionary whose contents are limited to voice commands and menu items that are employed within the restaurant system. Keywords that correspond to converted audio are then incorporated into messages generated by the speech processor 1024, which are then transmitted to a designated terminal via MSG.

The speech processor may alternatively employ an internet-based 3rd party speech-to-text service, which is accessed via messages generated/received over MSG. In this embodiment, audio signals/files that have been converted to text signals/files are received over MSG and used to index the keyword table 1026, and keywords that correspond to converted audio are then incorporated into messages generated by the speech processor 1024, which are then transmitted to a designated terminal via MSG.

Messages received and transmitted over MSG may further comprise captured motion from designated terminals. The messages are provided to a motion processor 1030 that includes a global gesture table 1032 that provides a mapping of captured motion to a global set of 3D gestures, such as, but not limited to, swipe left, swipe right, swipe up, swipe down, tap, tap and hold for cursor, double tap, reverse tap, etc. Captured motion that corresponds to 3D gestures is then transmitted to the designated terminals via messages over MSG. In one embodiment, all motion received over motion sensors in the restaurant system is processed by the motion processor 1032. In an alternative embodiment, one or more of the terminals themselves process motion detected by their corresponding motion sensors.

The backend server 1000 according to the present invention is configured to perform the functions and operations as discussed above. The server 1000 may comprise digital and/or analog logic, circuits, devices, or microcode (i.e., micro instructions or native instructions), or a combination of logic, circuits, devices, or microcode, or equivalent elements that are employed to execute the functions and operations according to the present invention as noted. The elements employed to accomplish these operations and functions within the server 1000 may be shared with other circuits, microcode, etc., that are employed to perform other functions and/or operations within the server 1000. According to the scope of the present application, microcode is a term employed to refer to a plurality of micro instructions. A micro instruction (also referred to as a native instruction) is an instruction at the level that a unit executes. For example, micro instructions are directly executed by a reduced instruction set computer (RISC) microprocessor. For a complex instruction set computer (CISC) microprocessor such as an x86-compatible microprocessor, x86 instructions are translated into associated micro instructions, and the associated micro instructions are directly executed by a unit or units within the CISC microprocessor.

The backend server 1000 may be embodied as one or more central processing units (CPUs) that are coupled to both transitory and non-transitory storage (i.e., memory), where one or more application programs that are configured to perform the server functions discussed above are stored in the non-transitory storage, transferred to the transitory storage at run time, and executed by the one or more CPUs.

Figure 11:
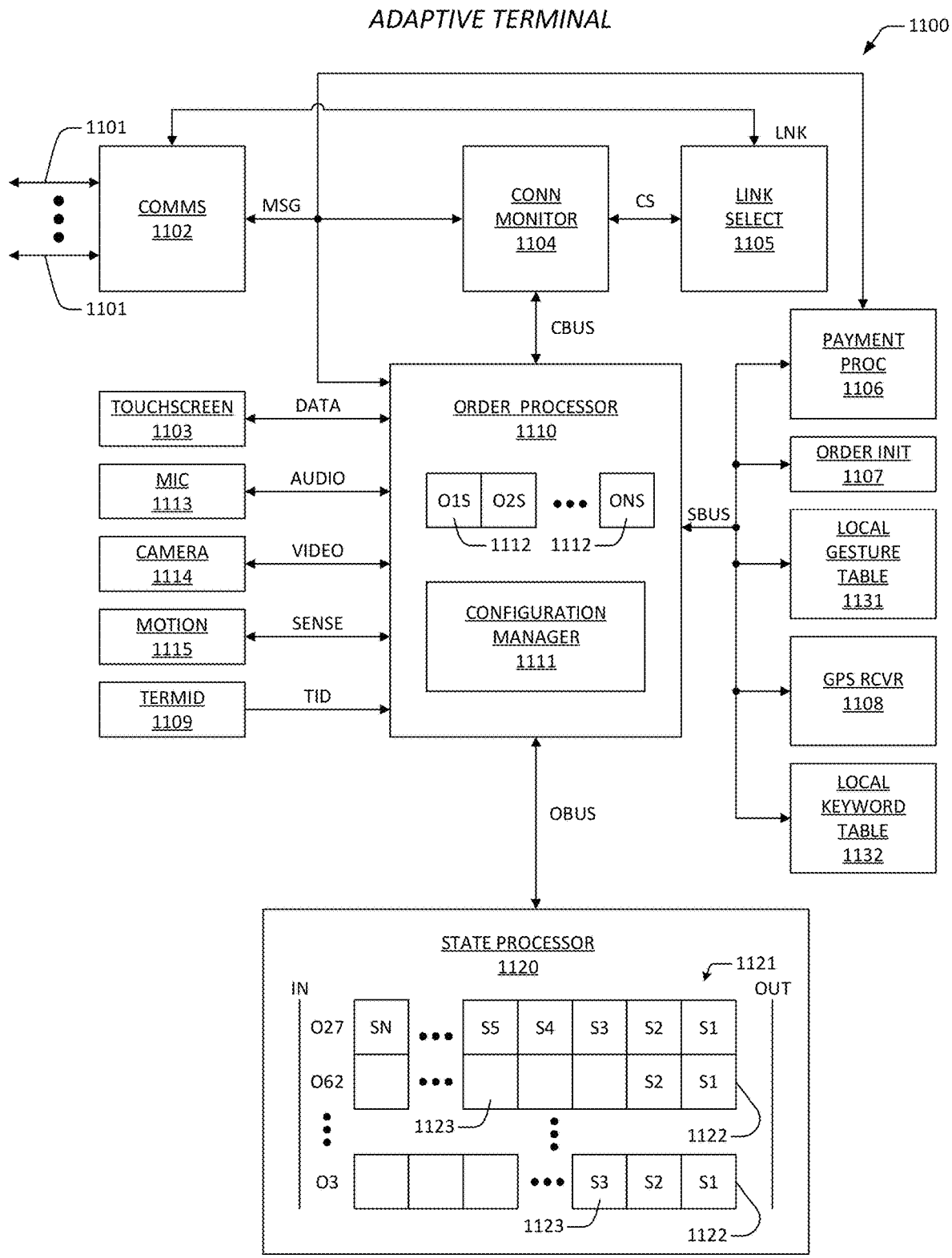
FIG. 11 is a block diagram showing an adaptive terminal according to the present invention.

FIG. 11 is a block diagram showing an adaptive terminal 1100 according to the present invention, as discussed above with reference to FIGS. 3-10. The terminal 1100 may comprise a communications circuit COMMS 1102 (e.g., transceivers, modems, message formatter, etc.) that is coupled to one or more wired or wireless communications links 1101, examples of which are described above with reference to FIG. 9-10. The terminal 1100 may also comprise a connection monitor 1104, an order processor 1110, a and a payment processor 1106, all of which are coupled to COMMS 302 via a message bus MSG. The terminal 1100 may also comprise a link select element 1105 that is coupled to the connection monitor via bus CS and to the COMMS 1102 via bus LNK. The order processor 1110 is coupled to the connection monitor 1104 via bus CBUS and to the payment processor 1106, an order initiation element 1107, a local gesture table 1131, a GPS receiver 1108, and a local keyword table 1132 via bus SBUS. The order processor 1110 is coupled to a touchscreen display 1103 via bus DATA, to a microphone 1113 via bus AUDIO, to a camera 1114 via bus VIDEO, to a motion sensor 1115 via bus SENSE, and to a terminal ID element 1109 via bus TID. The order processor 1110 is also coupled to a state processor 1120 via a queue bus QBUS.

The state processor 1120 may include a durable order update queue 1121 that includes order update records 1122, each of which are associated with a corresponding order for the terminal 400. Individual terminals 400 are identified by their corresponding terminal ID, which may be stored within and accessed from the terminal ID element 1109. The terminal ID element 1109 also is employed for storage and retrieval of terminal configuration information (e.g., KDS, kiosk, mobile terminal, etc.) along with enablement/disablement of order processing acceleration features (i.e., voice commands, 3D gestures, menu assist, facial recognition).

Each of the order update records 1122 may comprise order state fields 1123, which are employed to queue order state changes (i.e., order updates) for transmission to a synchronization server (not shown) as connectivity to the backend server permits. State fields 1123 nearest to OUT are the oldest order state changes queued for transmission to the backend server. State fields 1123 nearest to IN are youngest (or most recent) order state changes queued for transmission to the backend server. Fields 1123 between the oldest state fields 1123 and the youngest state fields 1123 descend in age from oldest to youngest order state change according to when those state changes are entered by the terminal 1100.

Values of the order state fields 1123 may include, but are not limited to, an order ID along with order details taken by the terminal 1100. Accordingly, the order update record 1122 for order 27 O27 depicts a plurality of order state fields 1123 to be transmitted to the server when connectivity is reestablished. In decreasing age from oldest to youngest order state change, the fields 123 depict order state changes 51 through SN. As one skilled in the art will appreciate, the order update record 422 O27 depicts that many more state changes have been entered while connection status of the terminal 1100 is down than have been entered for orders 62 O62 through order 3 O3. Advantageously, the terminal 1100 according to the present invention may be employed for entry of order updates even in the presence of network interruptions, which is characteristic of most Wi-Fi networks.

In operation, order state changes result from two sources: the touchscreen display 1103 and messages received over COMMS 1102 from the backend server. In the first case, wait staff may enter menu items as requested by patrons, or in the case that the terminal 1100 is configured as a kiosk 1100, the patrons may enter the order items themselves. The present invention contemplates provisions within the terminal 1100 to display menu selections and payment options to both wait staff and patrons. Order items received from the touchscreen display 1103 are provided to the order processor 1110 via bus DATA, which generates the state changes. State changes received from the backend server are provided to the order processor 1110 in messages over bus MSG.

The connection monitor 1104 may monitor reception of a first message (e.g., a ping message) from the backend server and direct transmission of an acknowledgement message. The connection monitor 1104 may update the connectivity status of the terminal 1100 accordingly. In one embodiment, acknowledgment may comprise a simple acknowledge message. In other embodiments, acknowledgement may comprise additional data such as received signal strength indication RSSI associated with one or more access points, number of hops between the backend server and the terminal 400, or Global Positioning System (GPS) coordinates, as will be described in further detail below.

The link select element 1105 may be employed to direct the COMMS 1102 to change links 1101 over which to communicate with the backend server, such as switching from Wi-Fi to LTE, for example. In one embodiment, in the absence of connectivity within the restaurant, the link select element 1105 may direct the COMMS 1102 to tether to a cellular equipped device corresponding to an order ID, such as devices 906 in FIG. 9, in order to transmit acknowledgements and order state changes to the backend server.

The connection monitor 1104 may provide connectivity status of the terminal 1100 to the order processor 1110 via bus CBUS. In one embodiment, the order processor 1110 may generate order state change messages from oldest to youngest update for each of the orders in the queue 1121. Connectivity is maintained when the terminal 1100 receives acknowledgement of a previously transmitted order state change message from the backend server. Once acknowledged, the order processor 1110 directs the state processor 1120 to delete the oldest state change update for a corresponding order ID and shift pending updates so that the next oldest state change update becomes the oldest order update. In one embodiment, state change updates are transmitted to the backend server until its order state change record 1122 is empty, or until connectivity goes down.

As discussed above, the terminal 1100 may be configured as a fixed or mobile POS terminal, a kiosk, a host terminal, a management terminal, or a KDS, where configurations differ principally in size of the touchscreen display 1103. As also discussed above, the camera 1114, microphone 1113, and motion sensor 1115 may be integrated in to the terminal 1100 or they may be coupled to the terminal 1100 via conventional bus technologies such as a USB port, PCI port, etc. The configuration parameters including order processing acceleration features for the terminal 1100 are stored in the terminal ID 1109 element, and the configuration parameters/features are accessed by a configuration manager 1111 within the order processor 1110 upon initialization/reconfiguration of the terminal 1100. Thus, the configuration manager 1111 may generate images for display on the touchscreen display 1103 and capture text and touches thereon, in accordance with functions prescribed according to configuration parameters/features accessed from the terminal ID element 1109. In accordance with configuration parameters/features accessed from the terminal ID element 1109, the configuration manager 1111 may also capture audio from the microphone 1113, video from the camera 1114, and motion from the motion sensor 1115, and may generate/receive messages over MSG to/from the backend server for that are required to recognize captured images, keywords, and 3D gestures. Once received, the configuration manager 1111 may access the local gesture table 1131, which provides a mapping of recognized 3D gesture to commands to be executed by the terminal 1100 and may execute the commands via data send to the touchscreen display 1103 over DATA. The configuration manager 1111 may additionally access the local keyword table 1132, which provides a mapping of text (converted from audio by the backend server) to commands to be executed by the terminal 1100 and may execute the commands via manipulation of the touchscreen display 1103, the microphone 1113, the camera 1115, and/or the motion sensor 1115. The local keyword table 1132 may also provide a mapping of keywords to menu suggestions, such as are discussed above with reference to FIG. 5, and may send corresponding text/images over DATA for display on the touchscreen display 1103.

Messages received from the communications circuit 1102 may also require additional functions to be performed by the terminal 1100. For example, when orders are placed by a browser-based or third-party based terminal, the backend server may transmit the order state change to the terminal 1100 and the order processor 1110 may direct the state processor 1120 to create a corresponding order status record 1122 in the queue 1121. Similarly, when processing of transactions outside of the terminal's capabilities (e.g., financial transactions with credit card providers, loyalty card discounts, etc.) are required, order processor 1110 may direct the payment processor 1106 to generate messages to the backend server to provide data (e.g., amounts, payment source type, card swipe/chip information, etc.) to complete the transactions. Such messages are transmitted via COMMS 302. The payment processor 1104 may further receive state changes (e.g., "order paid," "payment source 1 approved," "discount amount," etc.) to from the backend server and may provide these state changes to the order processor 1110 via TBUS. The order processor 1110 may then provide those updates to the queue 1121 via OBUS. The terminal 1100 may further be employed to create an order. Accordingly, from order entry data received over DATA, the order processor 1110 may direct the order initiation element 1107 to create an order ID and may also direct the state processor 1120 to create a corresponding order state record 1122 in the queue 1121.

The terminal 1100 terminal according to the present invention is employed to maintain a current state of all orders being fulfilled by the restaurant. The current state of each of the orders is stored in order current state fields 1112 within the order processor 1110. The order processor 1110 may also comprise domain specific rules, which define actions required to synchronize conflicting order state changes being received and/or processed by the terminal 1100, where the domain specific rules are unique to the restaurant. For example, suppose that one terminal 1100 transmits a state change for a specific order to the backend server, which is acknowledged by the backend server. Concurrently, a second terminal 1100 sends a state change for the same order. The backend server may respond to the second terminal with a message indicating that the order current state field 1112 for the order ID within the second POS terminal 1100 state is out of date (due to connection status) and providing the most recent current state of the order. The domain specific rules are employed by the order processor 1110 within the second terminal 1100 to merge the state changes local to the second terminal 1100 and may store the merged state in the corresponding current state field 1112. The order processor 1110 may then direct the COMMS 1102 to transmit the corresponding (reconciled) state field 1112 contents to the backend server for distribution to all of the terminals 400 in the restaurant.

Advantageously, the present invention provides for improvements in performance of computational resources within the terminals 1100 over that which has heretofore been provided because the terminal 1100 may be employed to process orders in the absence of network connectivity. In addition, unnecessary communications with the backend server are precluded due to on-board conflict resolution logic. Moreover, computing performance is increased because the terminal 1100 may be employed to process any of the other orders within the restaurant because the current states of all restaurant orders are resident therein. Overall improvements in the art are achieved through the synergistic and tailorable employment of facial recognition, voice commands, 3D gestures, and suggested menu selections based upon detected menu keywords.

The terminal 1100 according to the present invention is configured to perform the functions and operations as discussed above. The terminal 1100 may comprise digital and/or analog logic, circuits, devices, or microcode (i.e., micro instructions or native instructions), or a combination of logic, circuits, devices, or microcode, or equivalent elements that are employed to execute the functions and operations according to the present invention as noted. The elements employed to accomplish these operations and functions within the terminal 400 may be shared with other circuits, microcode, etc., that are employed to perform other functions and/or operations within the terminal 400. According to the scope of the present application, microcode is a term employed to refer to a plurality of micro instructions. A micro instruction (also referred to as a native instruction) is an instruction at the level that a unit executes. For example, micro instructions are directly executed by a reduced instruction set computer (RISC) microprocessor. For a complex instruction set computer (CISC) microprocessor such as an x86-compatible microprocessor, x86 instructions are translated into associated micro instructions, and the associated micro instructions are directly executed by a unit or units within the CISC microprocessor.

The terminal 1100 may be embodied as one or more central processing units (CPUs) that are coupled to both transitory and non-transitory storage (i.e., memory), where one or more application programs that are configured to perform the terminal functions discussed above are stored in the non-transitory storage, transferred to the transitory storage at run time, and executed by the one or more CPUs.

Figure 12:
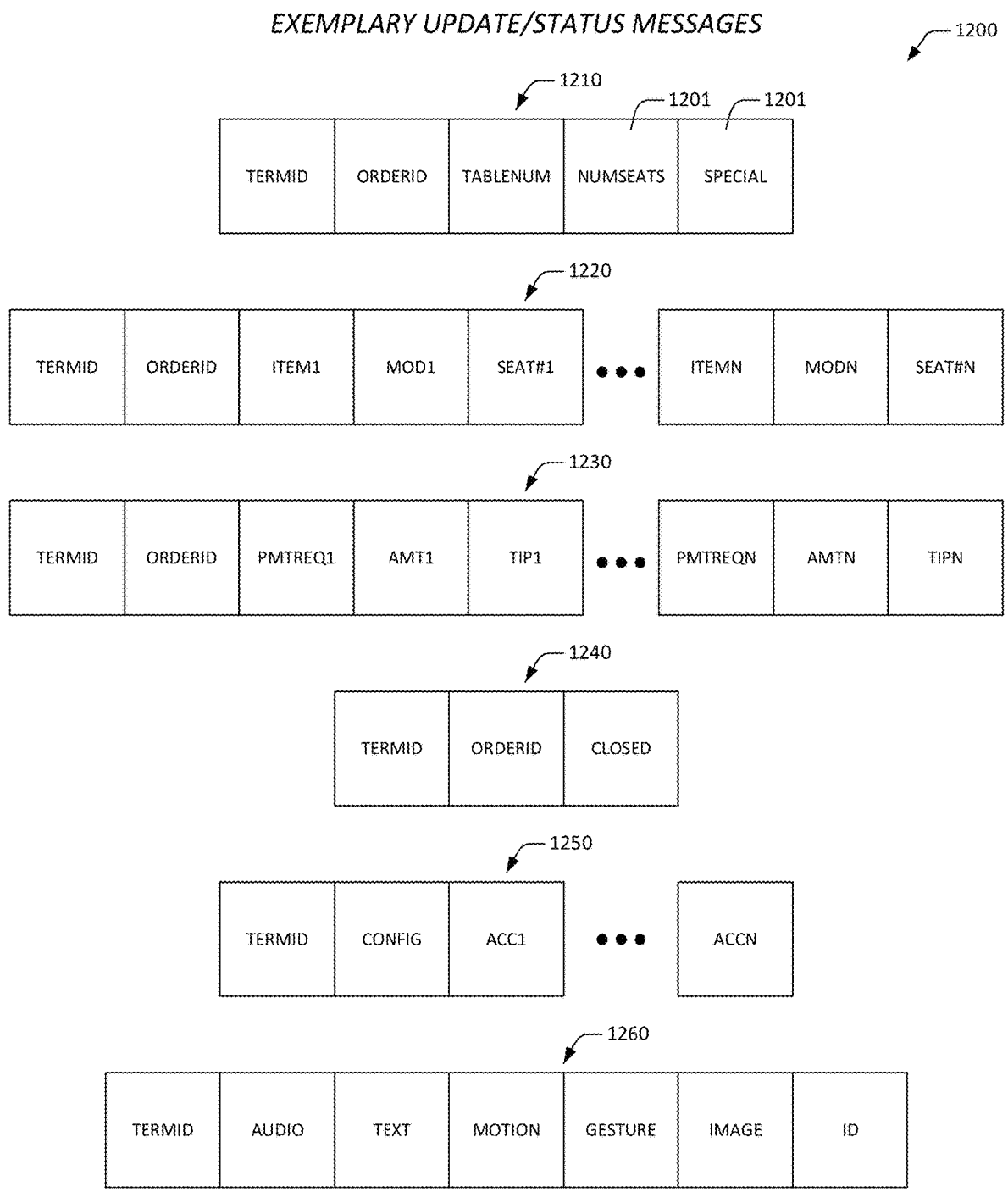
FIG. 12 is a diagram detailing exemplary update/status messages according to the present invention.

Finally turning to FIG. 12, is a diagram 1200 is presented detailing exemplary update/status messages according to the present invention that flow between a backend server and a terminal.

An order assignment message 1210 transmitted by the backend server to one or more terminals may comprise fields 1201 having a specific terminal ID TERMID assigned for a particular order ID ORDERID along with a table number TABLENUM having a given number of seats NUMSEATS. The message 1210 may further comprise a SPECIAL field 501 via which special requirements (e.g., high chair, wheel chair access) are communicated to the terminal.

An order state change message 1220 transmitted from a terminal to the backend server may comprise TERMID and ORDERID fields 1201 as described above, along with one or more groups of ITEM, MOD, and SEAT #fields 1201, where contents of the ITEM field 1201 indicated a menu item ordered for a given seat number at the table along with any modifications to the item number (e.g., rare, no onions, etc.).

A payment state change message 1130 transmitted from a terminal to the server may comprise TERMID and ORDERID fields along with one or more groups of PMTREQ, AMT, and TIP fields 1201, where contents of the PMTREQ field 1201 indicate a payment type (e.g., cash, MasterCard, etc.), and contents of AMT and TIP indicate amount of payment for the particular payment type along with a tip amount.

An order closeout message 1240 may comprise TERMID and ORDER ID fields 1201 as noted above, along with a CLOSED field 1201, the contents of which indicate whether the particular order ID is open or closed.

A terminal configuration message 1250 exchanged between a terminal and the backend server may comprise a TERMID field 1201 as noted above along with a CONFIG field 501 and a plurality of order processing acceleration features fields ACC1-ACCN 1201, where the contents of CONFIG specify configuration parameters for the terminal (e.g., KDS, POS terminal, management terminal, delivery terminal, kiosk, etc.). The order processing acceleration features fields ACC1-ACCN 1201 prescribe specific order acceleration features to be employed by the terminal such as, but not limited to, 3D gestures, voice recognition, facial recognition, and accelerated menu suggestions based upon recognized keywords.

A conversion message 1260 may comprise AUDIO, TEXT, MOTION, GESTURE, IMAGE, and ID fields 1201, where contents of AUDIO indicate captured audio that is transmitted to the backend server and contents of TEXT indicate text that has speech-to-text conversion has generated corresponding to the contents of AUDIO, and which is received by the terminal. Contents of MOTION indicate motions that are captured by the motion sensor that are transmitted to the backend server and contents of GESTURE indicate a 3D gesture received from the server that corresponds to the contents of MOTION. Likewise, contents of IMAGE indicate an image captured by the camera and which are transmitted to the server. The server in turn provides contents of ID, which provides an identity index that corresponds to the contents of IMAGE.

The messages 1210, 1220, 1230, 1240, 1250, 1260 are not exhaustive of those what may be employed according to the present disclosure but are provided herein to teach further aspects and advantages according to the present invention.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, a microprocessor, a central processing unit, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be electronic (e.g., read only memory, flash read only memory, electrically programmable read only memory), random access memory magnetic (e.g., a floppy disk or a hard drive) or optical (e.g., a compact disk read only memory, or "CD ROM"), and may be read only or random access. Similarly, the transmission medium may be metal traces, twisted wire pairs, coaxial cable, optical fiber, or some other suitable transmission medium known to the art. The invention is not limited by these aspects of any given implementation.

The particular embodiments disclosed above are illustrative only, and those skilled in the art will appreciate that they can readily use the disclosed conception and specific embodiments as a basis for designing or modifying other structures for carrying out the same purposes of the present invention, and that various changes, substitutions and alterations can be made herein without departing from the scope of the invention as set forth by the appended claims. For example, components/elements of the systems and/or apparatuses may be integrated or separated. In addition, the operation of the systems and apparatuses disclosed herein may be performed by more, fewer, or other components and the methods described may include more, fewer, or other steps. Additionally, unless otherwise specified steps may be performed in any suitable order.

Although specific advantages have been enumerated above, various embodiments may include some, none, or all of the enumerated advantages.

What is claimed is:

1. A user-adaptive order processing terminal, comprising:
    a display, configured to display electronic menu items in a first area for selection by a user, wherein said electronic menu items are displayed when said user selects one or more sub-menu hyperlinks on said display;
    a microphone, configured to detect speech spoken by said user;
    a configuration manager, coupled to said display and said microphone, configured to capture said speech from said microphone, to transmit said speech via first messages to a backend server, to receive second messages from said backend server providing one or more keywords that correspond to said speech, to access suggested menu items that correspond to said one or more keywords, and to modify a second area of said display to present said suggested menu items for selection, wherein said suggested menu items would otherwise be presented in said first area through selection of said one or more sub-menu hyperlinks, wherein said backend server is not on-premise with the terminal; and
    a motion sensor, coupled to said configuration manager, configured to subsequently detect distance to and movements performed by said user, wherein said configuration manager captures said movements from said motion sensor, transmits said movements via third messages to said backend server, receives fourth messages from said backend server providing 3-dimensional (3D) gestures that correspond to said movements, and to access and execute commands corresponding to said 3D gestures to add one or more of said suggested menu items to one of a plurality of electronic orders, wherein said 3D gestures do not require said user to have physical contact with said motion sensor.

2. The user-adaptive order processing terminal as recited in claim 1, further comprising:
    a local gesture table, coupled to said configuration manager, that provides a mapping from said 3D gestures to said commands executed by the terminal, wherein said configuration manager executes said commands via data sent to said display.

3. The user-adaptive order processing terminal as recited in claim 2, wherein said display comprises a touchscreen display, and wherein the terminal is employed as a self-ordering kiosk, and wherein said user is not required to touch said display in order to create said electronic order.

4. The user-adaptive order processing terminal as recited in claim 2, wherein said terminal further comprises:
    a state processor, configured to queue state changes in order queues that correspond to said one of said plurality of electronic orders; and
    an order processor, coupled to said state processor and within which said configuration manager is disposed, configured to generate said state changes, and configured to access and transmit said state changes in each of said order queues to said backend server, from oldest to youngest, when operably connected to a network, wherein said order processor comprises current order state fields corresponding to all of said plurality of electronic orders.

5. The user-adaptive order processing terminal as recited in claim 4, wherein the terminal operably connects to said network via one or more Wi-Fi access points.

6. The user-adaptive order processing terminal as recited in claim 1, wherein said configuration manager modifies text size of said one of said plurality of electronic orders on said display as a function of said distance.

7. The user-adaptive order processing terminal as recited in claim 1, further comprising:
    a local keyword table, coupled to said configuration manager, that provides a mapping of said one or more keywords to said suggested menu items.

8. A user-adaptive order processing terminal, comprising:
    a display, configured to display electronic menu items in a first area for selection by a user, wherein said electronic menu items are displayed when said user selects one or more sub-menu hyperlinks on said display;
    a microphone, configured to detect speech spoken by said user;
    an order processor, coupled to said display and a motion sensor, configured to maintain current states of all of a plurality of electronic orders, said order processor comprising:
        current state fields, each maintaining a current state for a corresponding one of said plurality of electronic orders; and
    a configuration manager, coupled to said display and said microphone, configured to capture said speech from said microphone, to transmit said speech via first messages to a backend server, to receive second messages from said backend server providing one or more keywords that correspond to said audio, to access suggested menu items that correspond to said one or more keywords, and to modify a second area of said display to present said suggested menu items for selection, wherein said suggested menu items would otherwise be presented in said first area through selection of said one or more sub-menu hyperlinks, wherein said backend server is not on-premise with the terminal; and
    said motion sensor, coupled to said order processor, configured to subsequently detect distance to and movements performed by said user, wherein said configuration manager captures said movements from said motion sensor, transmits said movements via third messages to said backend server, receives fourth messages from said backend server providing 3-dimensional (3D) gestures that correspond to said movements, and accesses and executes commands corresponding to said 3D gestures to add one or more of said suggested menu items to said corresponding one of a plurality of electronic orders, wherein said 3D gestures do not require physical contact with said motion sensor.

9. The user-adaptive order processing terminal as recited in claim 8, further comprising:
    a local gesture table, coupled to said order processor, that provides a mapping from said 3D gestures to said commands to be executed by the terminal, wherein said configuration manager executes said commands via data sent to said display.

10. The user-adaptive order processing terminal as recited in claim 9, wherein said display comprises a touchscreen display, and wherein the terminal is employed as a self-ordering kiosk, and wherein said user is not required to touch said display in order to create said electronic order.

11. The user-adaptive order processing terminal as recited in claim 9, wherein said terminal further comprises:

a state processor, configured to queue state changes in order queues that correspond to said plurality of electronic orders, wherein said order processor generates said state changes, and to accesses and transmits said state changes in each of said order queues to said backend server, from oldest to youngest, when operably connected to a network.

12. The user-adaptive order processing terminal as recited in claim 11, wherein the terminal operably connects to said network via one or more Wi-Fi access points.

13. The user-adaptive order processing terminal as recited in claim 8, wherein said configuration manager modifies text size of said corresponding one of said plurality of electronic orders on said display as a function of said distance to said user.

14. The user-adaptive order processing terminal as recited in claim 8, further comprising:
- a local keyword table, coupled to said configuration manager, that provides a mapping of said one or more keywords to said suggested menu items.

15. A user-adaptive order processing method, comprising:
- displaying electronic menu items in a first area for selection by a user, wherein the electronic menu items are displayed when the user selects one or more sub-menu hyperlinks on the display;
- employing a microphone to detect speech spoken by the user;
- capturing the speech from the microphone, transmitting the speech via first messages to a backend server, receiving second messages from the backend server providing one or more keywords that correspond to the speech, accessing suggested menu items that correspond to the one or more keywords, and modifying a second area of the display to present the suggested menu items for selection, wherein the suggested menu items would otherwise be presented in the first area through selection of the one or more sub-menu hyperlinks, wherein the backend server is not on-premise; and
- subsequently detecting distance to and movements performed by the user by capturing the movements from a motion sensor, transmitting the movements via third messages to the backend server, receiving fourth messages from the backend server providing 3-dimensional (3D) gestures that correspond to the movements, and accessing and executing commands corresponding to the 3D gestures to add one or more of the suggested menu items to one of a plurality of electronic orders, wherein the 3D gestures do not require physical contact with the motion sensor.

16. The method as recited in claim 15, further comprising:
- mapping the 3D gestures to the commands to be executed by the terminal, wherein the commands, are executed via data sent to the display.

17. The method as recited in claim 16, wherein the display comprises a touchscreen display, and wherein the terminal is employed as a self-ordering kiosk, and wherein said user is not required to touch said display in order to create said electronic order.

18. The method as recited in claim 16, wherein the terminal further comprises:
- via a state processor, queueing state changes in order queues that correspond to the one of the plurality of electronic orders; and
- generating the state changes, and accessing and transmitting the state changes in each of the order queues to a backend server, from oldest to youngest, when operably connected to a network.

19. The method as recited in claim 15, further comprising:
- modifying text size of the one of the plurality of electronic orders on the display as a function of the distance.

20. The method as recited in claim 15, further comprising:
- via a local keyword table, mapping the one or more keywords to the suggested menu items.

* * * * *